United States Patent [19]

Takashima et al.

[11] Patent Number: 5,138,655
[45] Date of Patent: Aug. 11, 1992

[54] TELEPHONE APPARATUS CAPABLE OF SETTING CARD UNIT THEREIN

[75] Inventors: Shoichi Takashima, Tokyo; Kuniaki Ohtsuka; Yoshihiro Tanigawa, both of Yokohama; Shoji Suzuki, Atsugi; Shunji Arai, Yokohama; Shigeru Hiroki, Hiratsuka; Yuichiro Tsutsui; Mitsuhiro Watanabe, both of Yokohama, all of Japan

[73] Assignee: Canon Kabushiki Kaisha, Tokyo, Japan

[21] Appl. No.: 657,179

[22] Filed: Feb. 15, 1991

[30] Foreign Application Priority Data

| Feb. 17, 1990 | [JP] | Japan | 2-036712 |
| Apr. 3, 1990 | [JP] | Japan | 2-089408 |
| Apr. 19, 1990 | [JP] | Japan | 2-103365 |
| Apr. 19, 1990 | [JP] | Japan | 2-103366 |

[51] Int. Cl.⁵ .................... H04M 1/64; H04M 1/21
[52] U.S. Cl. ...................... 379/157; 379/201
[58] Field of Search ............ 379/156, 157, 217, 201, 379/37, 38, 47, 165, 87

[56] References Cited

FOREIGN PATENT DOCUMENTS 0044157 2/1989 Japan .................... 379/201

Primary Examiner—Stafford D. Schreyer
Attorney, Agent, or Firm—Fitzpatrick, Cella, Harper & Scinto

[57] ABSTRACT

A telephone apparatus includes an extension telephone for receiving data from a card, a timepiece unit, and a control unit for alarming a coincidence between time data included in the data received from the extension telephone and time data of the timepiece unit. The control unit performs a display on the basis of display data included in the data received by the extension telephone.

37 Claims, 45 Drawing Sheets

FIG. 4

| EXTENSION | TIME | REASON | DESTINATION TO BE INFORMED |
|---|---|---|---|
| 1 | 9:00<br>10:30<br>14:00<br>17:00<br>17:30 | CONFERENCE<br>VISITOR<br>GOING OUT<br>RETURN<br>CONFERENCE | GROUP A<br>ALL EXTENSIONS<br>EXTENSION 1<br>ALL EXTENSIONS<br>EXTENSION 1 |
| 2 | 9:00<br>11:00 | CONFERENCE<br>GOING OUT | GROUP A<br>EXTENSION 2 |
| 3 | 10:00<br>15:00<br>16:30 | VISITOR<br>CONFERENCE<br>VISITOR | ALL EXTENSIONS<br>EXTENSION 3<br>GROUP B |

FIG. 8

| | |
|---|---|
| EXTERNAL LINE 113 | 10 |
| EXTERNAL LINE 114 | 11 |
| EXTERNAL LINE 115 | 12 |
| ⋮ | |
| UNREGISTERED | |

| | |
|---|---|
| 3 | 1 |
| 3 | 0 |
| 3 | 2 |
| 3 | 2 |
| 3 | 0 |
| 3 | 8 |
| 3 | 4 |
| 3 | 5 |

| | | |
|---|---|---|
| F | F | ⎫ 150 |
| 3 | 1 | ⎫ |
| 3 | 0 | ⎬ 151 |
| 3 | 2 | |
| 3 | 2 | ⎭ |
| 3 | 0 | ⎫ |
| 3 | 8 | ⎬ 152 |
| 3 | 0 | |
| 3 | 0 | ⎭ |
| 0 | 0 | } 153 |
| 3 | 1 | ⎫ |
| 3 | 0 | ⎬ 154 |
| 3 | 0 | |
| 3 | 0 | ⎭ |
| 0 | 1 | } 155 |
| | | |
| F | F | |

FIG. 11

| | |
|---|---|
| | ~ 160 |
| 11 | ⎫ |
| 12 | ⎬ 161 |
| UNREGISTERED | ⎭ |
| 10 | ⎫ |
| 12 | ⎬ 162 |
| UNREGISTERED | ⎭ |
| 10 | ⎫ |
| 11 | ⎬ 163 |
| UNREGISTERED | ⎭ |

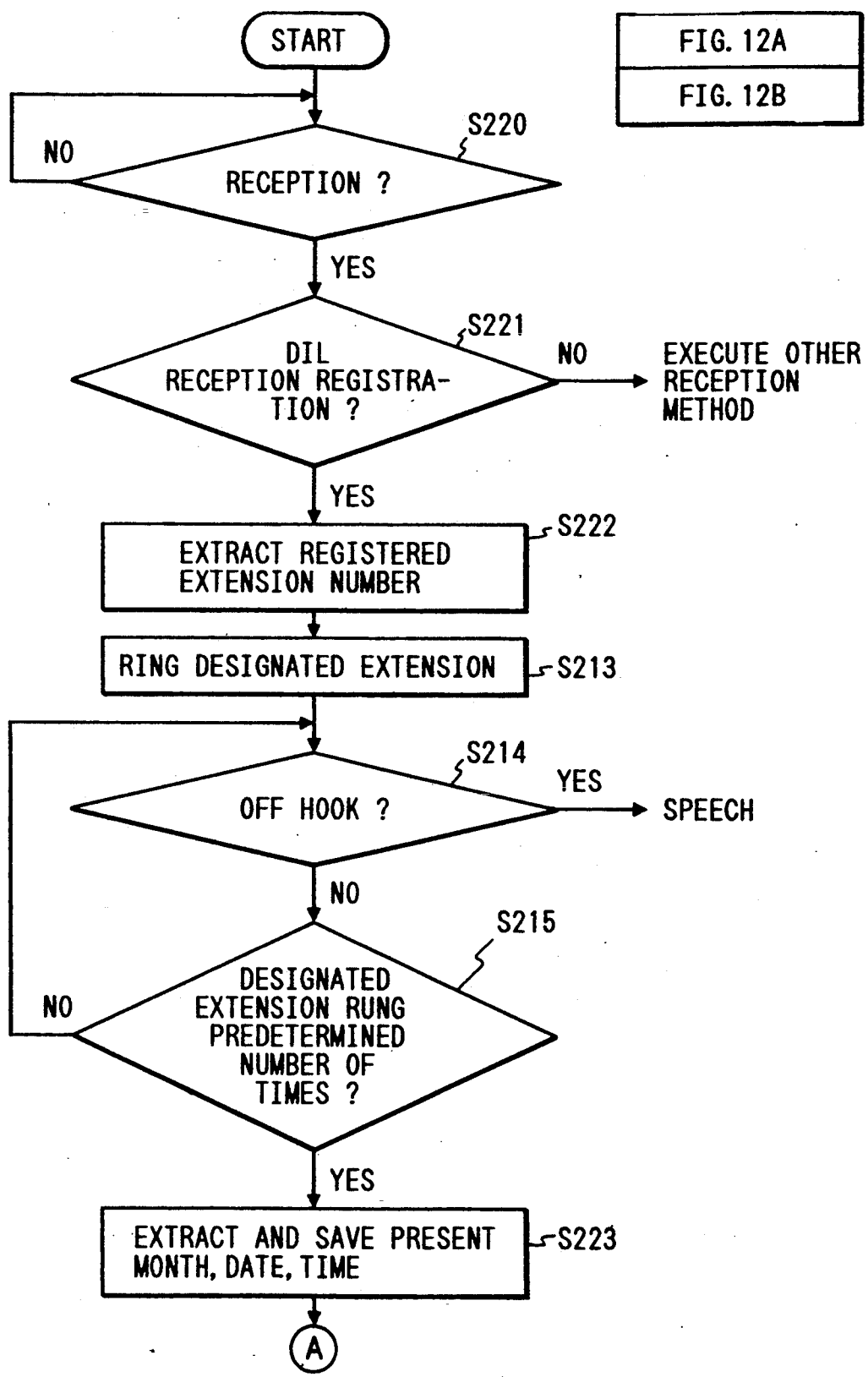

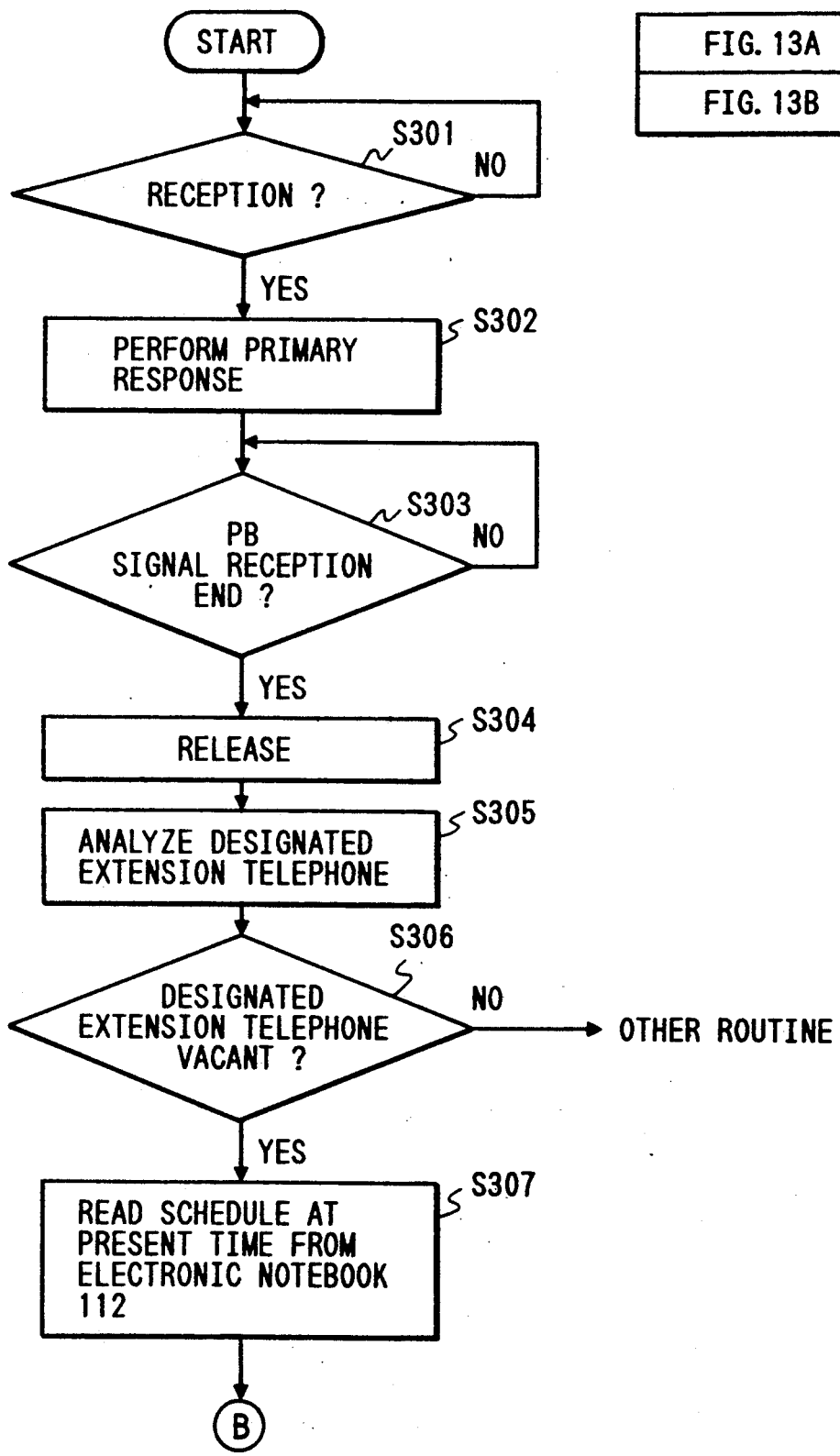

FIG. 14

| 15 NOV. | |
|---|---|
| 9:00 ∫ 10:00 | PRESENCE |
| ∫ 12:00 | CONFERENCE ROOM |
| ∫ 13:00 | RESTAURANT |
| ∫ 15:00 | PRESENCE |
| ∫ 17:00 | CONFERENCE ROOM |
| ∫ 18:00 | PRESENCE |

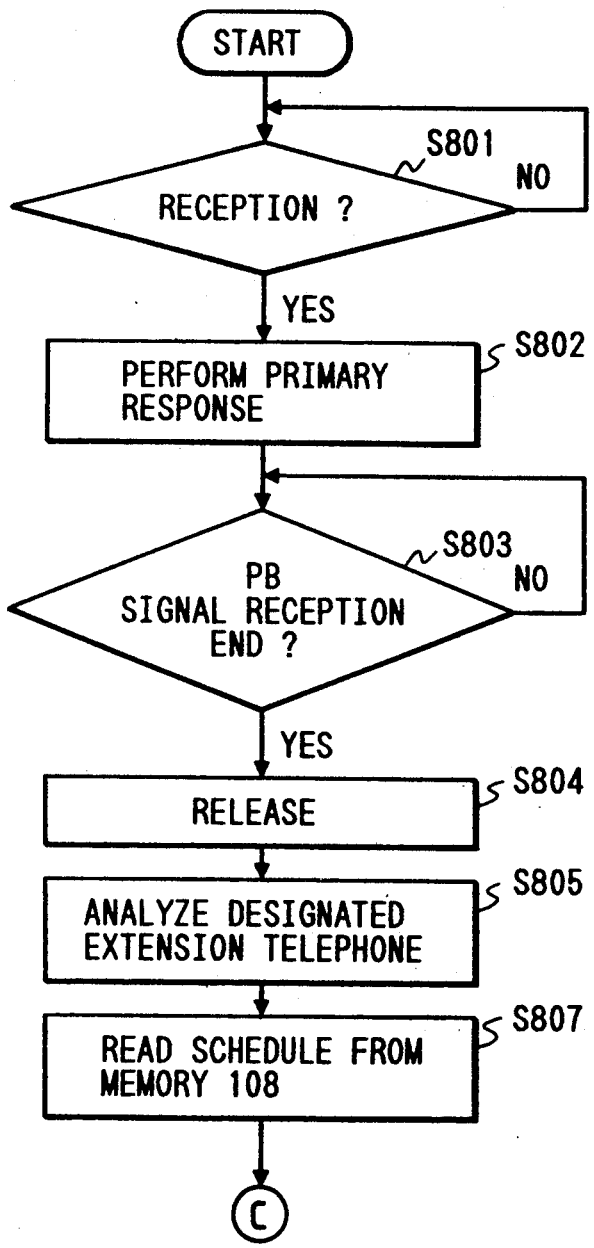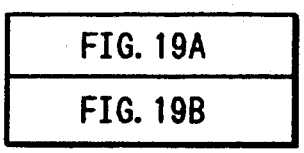

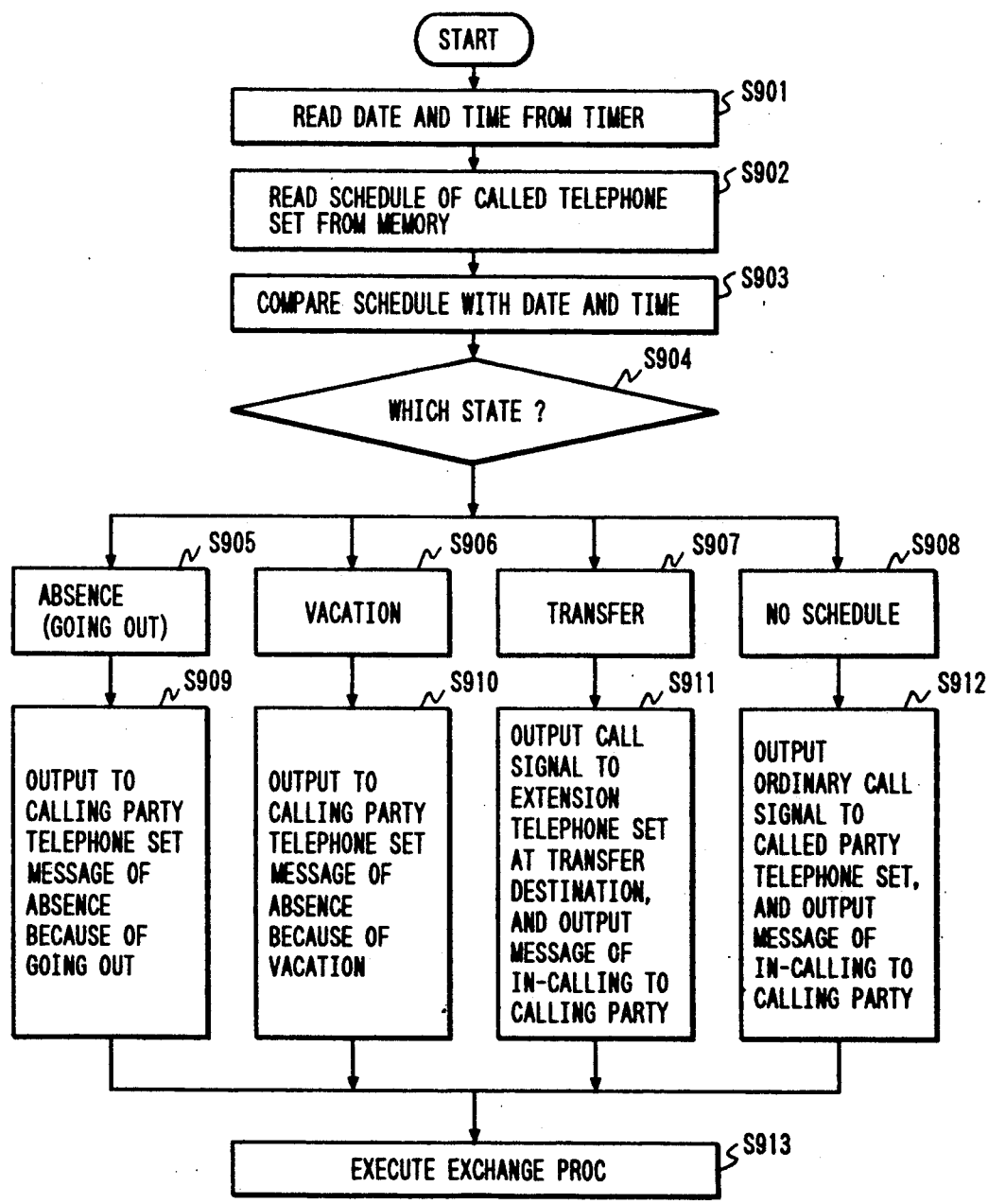

FIG. 21

| 1 DEC. 8:30– 9:00 | TRANSFER DESTINATION 243 (NO. 4 CONFERENCE ROOM) |
| --- | --- |
| 2 DEC. 10:00–12:00 | ABSENCE (GOING OUT TO S COMPANY) |
| 2 DEC. 18:00–4 DEC. 8:30 | VACATION |
| 5 DEC. 13:00–15:00 | TRANSFER DESTINATION 446 (NO. 5 CONFERENCE ROOM) |

FIG. 26

| DATE | TIME | NAME | SCHEDULE |
|------|------|------|----------|
| 10/21 | 10:30 | ARAI | A CONFERENCE ROOM |
|  | 10:30 | TSUTSUI | A CONFERENCE ROOM |
|  | 17:00 | NISHIKAWA | H COMPANY MEETING |
| 10/22 | 9:00 | TAKASHIMA | TRIP |
|  | 13:00 | ARAI | B BUSINESS SHOW |

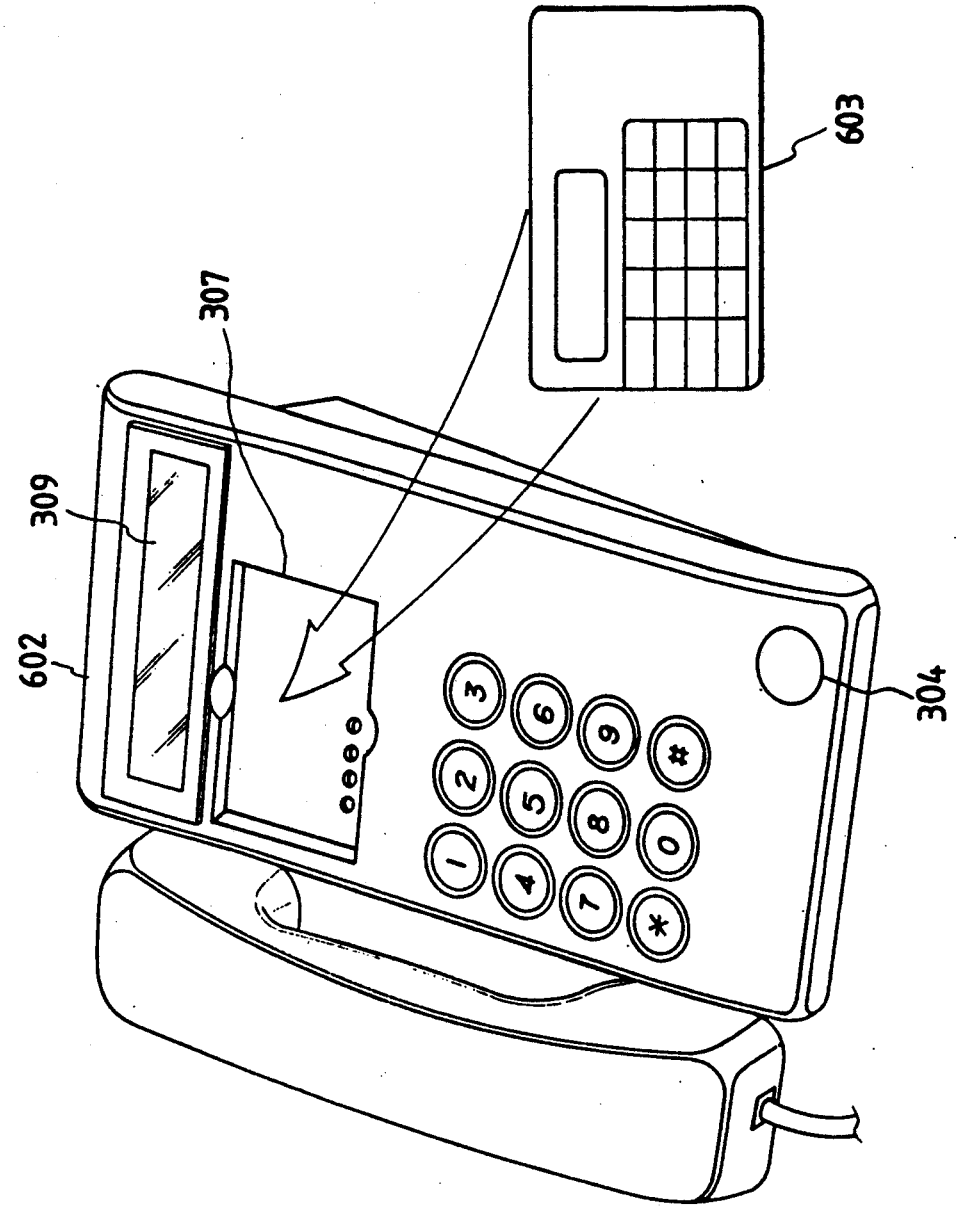

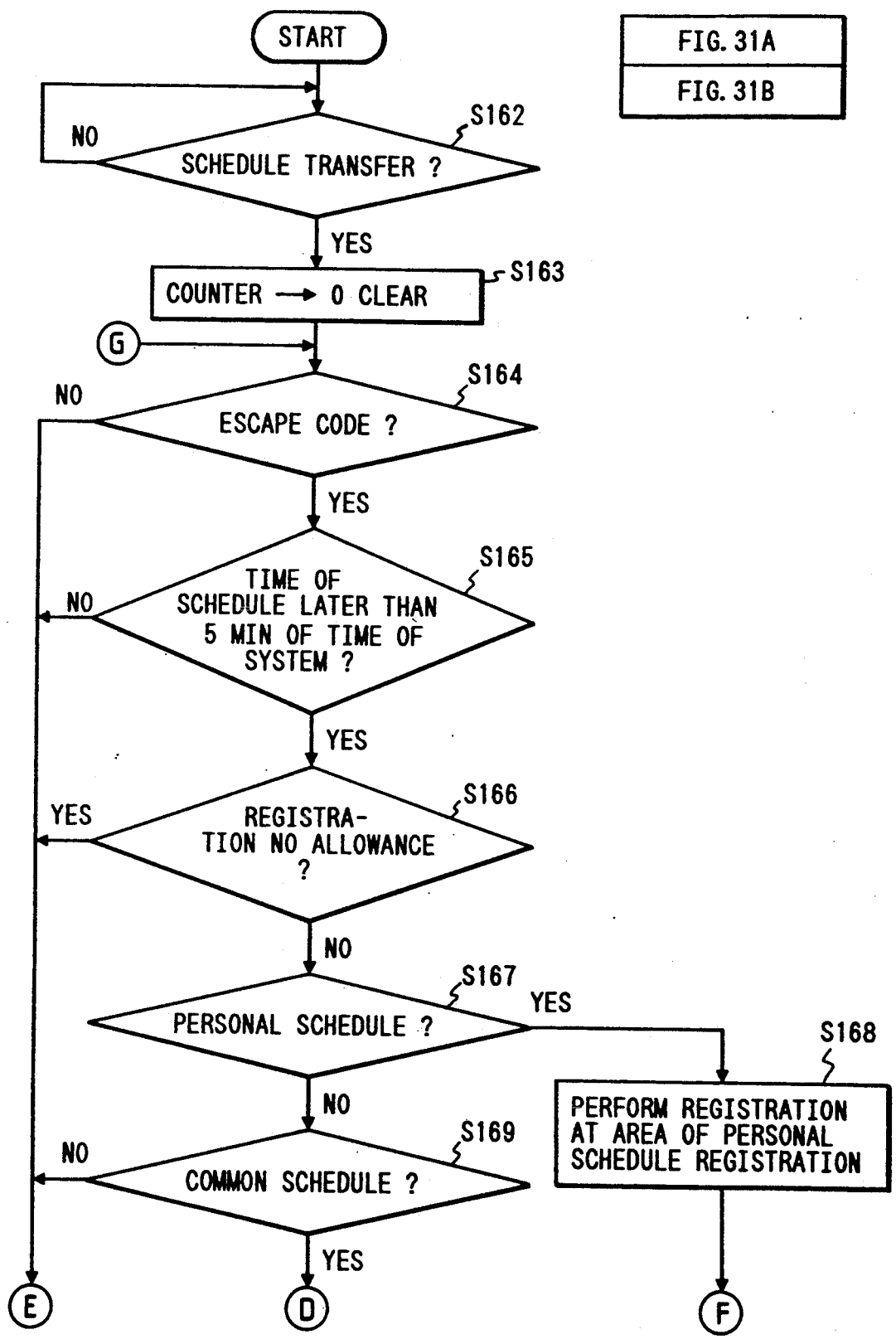

FIG. 33

| ESCAPE CODE | SCHEDULE TYPE |
|---|---|
| ¥0 | REGISTRATION NO ALLOWANCE |
| ¥1 | PERSONAL SCHEDULE |
| ¥2 | COMMON SCHEDULE |

FIG. 34

| YEAR | MONTH | DATE | TIME | ESCAPE CODE | SCHEDULE COMMENT |
|---|---|---|---|---|---|

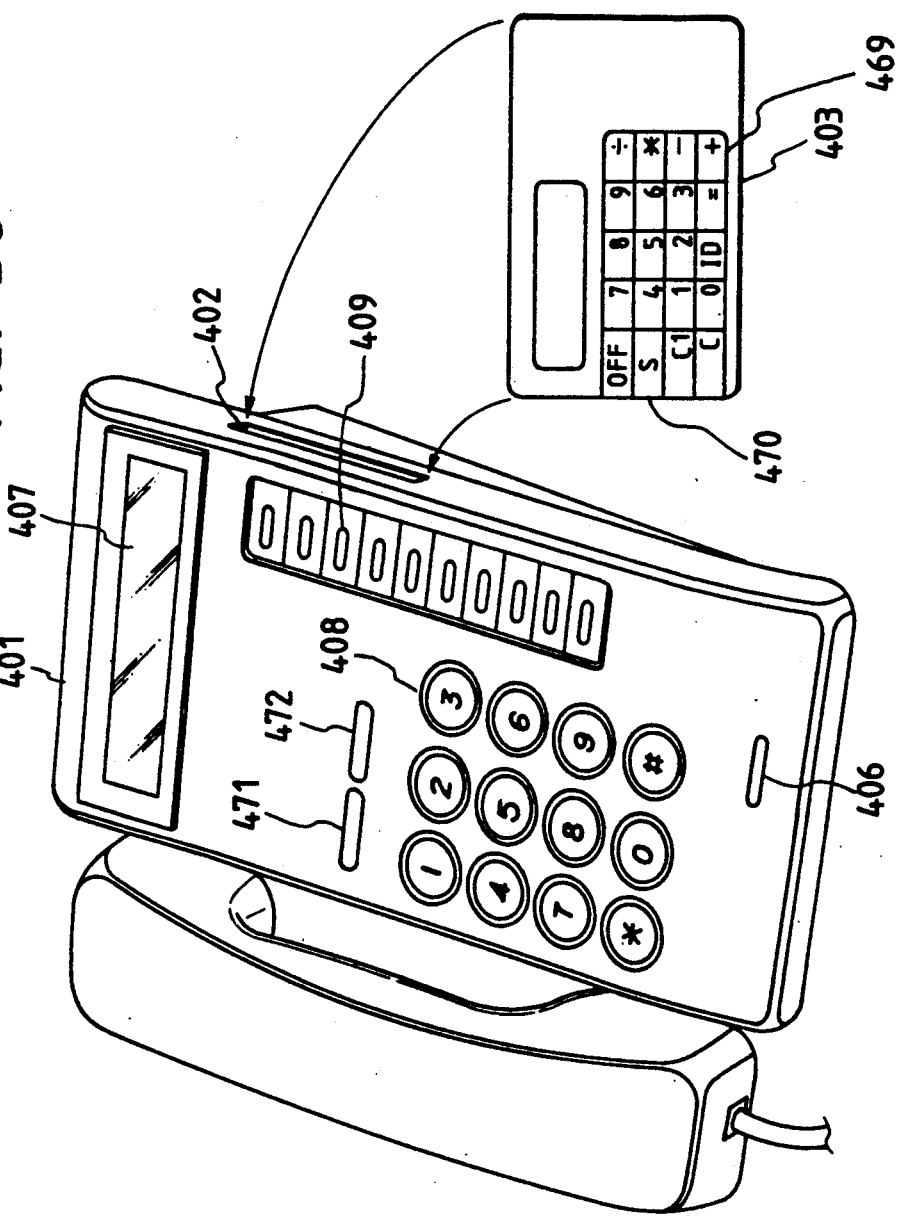

FIG. 41

| # | 1 | 2 | 3 | # |
|---|---|---|---|---|
| 8 9 1 0 2 3 0 7 5 0 2 1 0 7 |
| 8 9 1 0 2 4 0 7 5 1 2 0 3 6 |
| 8 9 1 0 2 5 0 7 5 5 1 7 0 5 |
| 8 9 1 0 2 6 0 7 5 2 2 1 3 3 |
| 8 9 1 0 2 7 0 7 5 3 2 1 0 2 |

WORKING TIME MANAGEMENT RAM

| # 1 2 3 # |
|---|
| % 8 9 1 2 0 5 0 7 5 0 0 0 0 0 |
| $ 8 9 1 2 0 1 1 3 0 0 1 5 0 0 |
| SHINJUKU $ |
| $ 8 9 1 2 0 5 1 1 0 0 1 7 0 0 |
| FACTORY $ |
| |

WORKING TIME SETTLEMENT RAM

| # 1 2 3 # |
|---|
| $ 8 9 1 2 0 1 1 3 0 0 1 5 0 0 |
| SHINJUKU $ |
| % 8 9 1 2 0 1 0 7 5 3 2 1 0 3 |
| % 8 9 1 2 0 4 0 7 5 1 2 0 3 5 |
| $ 8 9 1 2 0 5 1 1 0 0 1 7 0 0 |
| FACTORY $ |
| |

TELEPHONE APPARATUS CAPABLE OF SETTING CARD UNIT THEREIN

BACKGROUND OF THE INVENTION

1. Field of the Invention

The present invention relates to a telephone apparatus capable of setting a card unit therein.

2. Related Background Art

Some conventional telephone apparatuses have a function of setting desired time and generating an alarm tone at the set time.

In such a conventional telephone apparatus, the alarm tone is simply generated at the set time, and a user does not understand what schedule the alarm tone represents.

When an incoming call (e.g., dial-in, DID (Direct In-word Dial) or DIL (Direct In-Line)) from an external line, which specifies a given extension, is received by a conventional telephone apparatus, if a called party or callee at the given extension is absent, another person answers the phone to inform that the specified callee is absent, or to transfer the call to a destination telephone set.

In a conventional key telephone set, a mode representing the absence of the callee or transfer of an incoming call at the time of absence of the callee can be set or canceled with a key operation on the telephone set. In this case, when a call is made from an extension to a telephone set in which an absence mode is set, a message representing that the callee is absent is displayed on a source telephone set. When a transfer mode in the absence of the callee is set, a call is made to an extension telephone set having a preset transfer destination telephone number.

In the conventional apparatus, however, it is very inconvenient for a person except for the callee if the absence or transfer mode is not set.

When the absence of a callee is registered in advance, the designated extension telephone does not ring. When a user forgets to cancel the absence mode, and the target extension telephone cannot ring to cause uncomfort of a caller, resulting in inconvenience.

Conventional electronic notebooks independently manage schedules.

It is therefore difficult to know schedules of others in the conventional electronic notebooks.

There is available a system using a key telephone set to input a specific key to manage working start and end times of workers on the basis of the input time in order to manage the working start and end times of the workers by utilizing the key telephone set.

In this system, button operations for registering working start and end times are cumbersome, resulting in inconvenience.

SUMMARY OF THE INVENTION

It is an object of the present invention to provide a convenient telephone apparatus.

It is another object of the present invention to improve a telephone apparatus.

It is still another object of the present invention to provide a telephone apparatus for alarming coincidence between time data received from a card and current time.

It is still another object of the present invention to provide a telephone exchange apparatus for performing reception control in accordance with an input schedule.

It is still another object of the present invention to provide an apparatus for performing reception control on the basis of whether a card is set or not.

It is still another object of the present invention to provide a telephone exchange apparatus capable of simply managing schedules.

It is still another object of the present invention to provide a telephone exchange apparatus capable of registering working/non-working of a worker.

It is still another object of the present invention to provide a telephone exchange apparatus for displaying display data received from a card when time data received from the card coincides with the current time.

It is still another object of the present invention to provide a telephone exchange apparatus capable of calling a given operator even if the given operator moves to different locations.

The above and other objects, features, and advantages of the present invention will be apparent from the detailed description of the following preferred embodiments in conjunction with the accompanying drawings.

BRIEF DESCRIPTION OF THE DRAWINGS

FIG. 4 is a table showing a memory map of a RAM 21 of the first embodiment;

FIG. 8 is a table showing a memory map of a DIL designation registration memory according to the second embodiment;

FIG. 9 is a table showing a month, day, time save area map according to the second embodiment;

FIG. 10 is a table showing a reception schedule data save area according to the second embodiment;

FIG. 11 is a table showing an absent ringing extension registration save area;

FIG. 12–12B are a flow chart showing an operation according to the third embodiment;

FIG. 13–13B are a flow chart showing an operation according to the fourth embodiment;

FIG. 14 is a table showing a schedule data map according to the fourth embodiment;

FIG. 20 is a flow chart showing an operation according to the tenth embodiment;

FIG. 21 is a table showing a schedule data map according to the tenth embodiment;

FIG. 26 is a view showing a schedule output according to the eleventh embodiment;

FIG. 30 is a perspective view of an extension telephone and an electronic notebook according to the thirteenth embodiment;

FIG. 31-31B are flow chart showing schedule data registration processing according to the thirteenth embodiment;

FIG. 33 is a table showing correspondence between escape codes and schedule types according to the thirteenth embodiment;

FIG. 34 is a table showing a schedule type escape code format according to the thirteenth embodiment;

FIG. 36 is a perspective view of an extension telephone and an electronic notebook according to the fourteenth embodiment;

FIG. 41 is a table showing a data format of a RAM according to the fourteenth embodiment;

FIG. 42 is a view showing a display state according to the fourteenth embodiment;

FIG. 43 is a table showing data formats of a RAM according to the fifteenth embodiment of the present invention;

DETAILED DESCRIPTION OF THE PREFERRED EMBODIMENTS

First Embodiment

In this embodiment, schedule data is received from an electronic notebook, the key telephone system rings at time designated with the schedule data, and a display designated by the received schedule data is performed.

Figure 1:
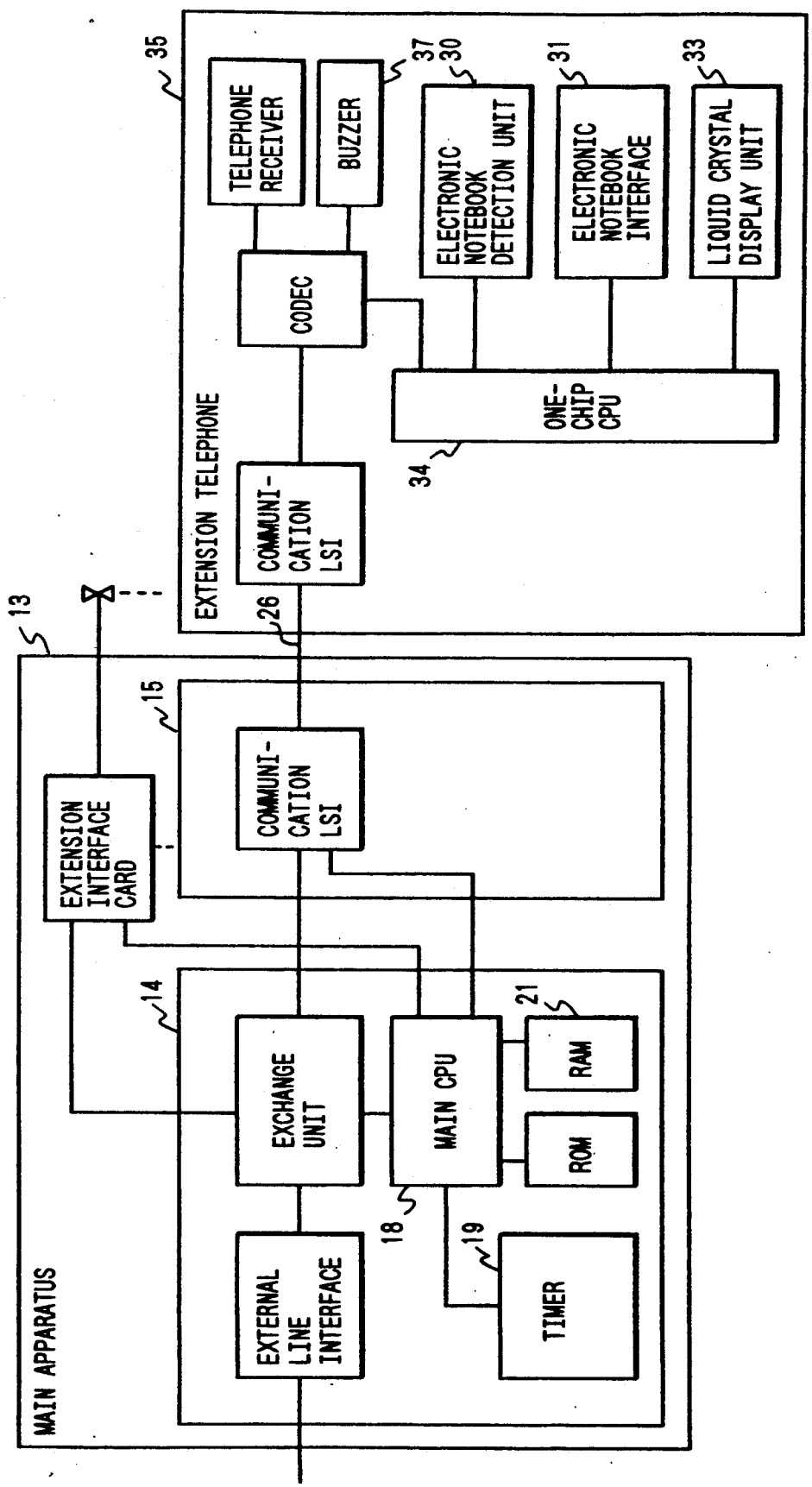
FIG. 1 is a block diagram of showing an extension telephone and a main apparatus of a key telephone system according to the first embodiment of the present invention.

FIG. 1 is a block diagram of an extension telephone 35 and a main apparatus 13 of a key telephone system according to the first embodiment of the present invention. Referring to FIG. 1, the main apparatus 13 includes a main board 14, an extension interface card 15, a main CPU (Central Processing Unit) 18, a timer 19, and a RAM (Random Access Memory) 21. The main apparatus 13 is connected to the extension telephone 35 through an extension transmission line 26. The extension telephone 35 includes an electronic notebook detection unit 30, an electronic notebook interface 31, a liquid crystal display unit 33, a one-chip CPU 34, and a buzzer 37 for generating a tone upon reception of an incoming call.

Figure 2:
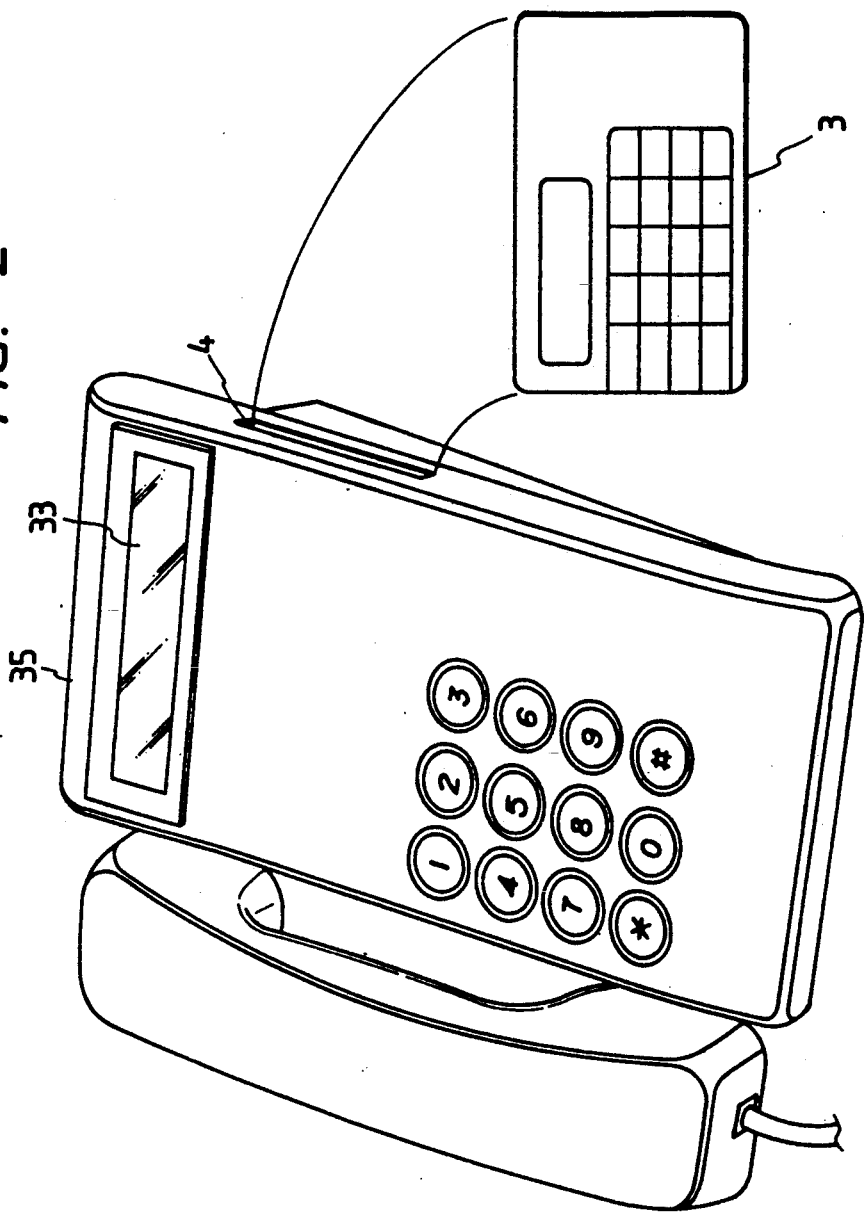
FIG. 2 is a perspective view showing an extension telephone connected in the key telephone system of the first embodiment and an electronic notebook.

FIG. 2 is an perspective view of this embodiment. An electronic notebook 3 has a card-like shape, and the extension telephone 35 has a slit 4 for receiving the electronic notebook 3.

Figure 3:
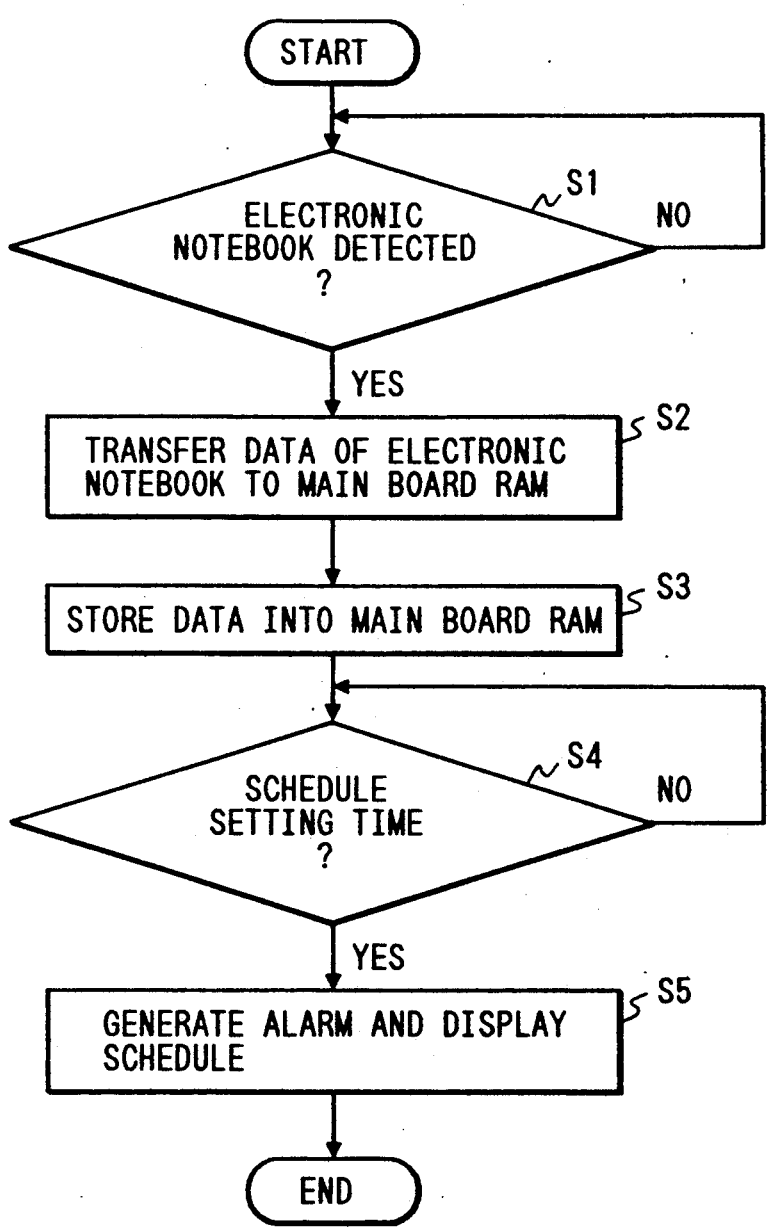
FIG. 3 is a flow chart showing an operation for transferring data from the electronic notebook and informing a schedule according to the first embodiment.

FIG. 3 is a flow chart showing an operation.

When the electronic notebook 3 is inserted into the extension telephone 35, as indicated in FIG. 2, the one-chip CPU 34 causes the electronic notebook detection unit 30 to detect that the electronic notebook 3 is set (step S1). The one-chip CPU 34 starts reception of schedule data from the electronic notebook 3 through the electronic notebook interface 31. The schedule data include time data and display data such as schedule names. These schedule data are registered in the electronic notebook 3 in advance.

The CPU 34 transfers the received data through the extension transmission line 26 (step S2). The CPU 18 stores the data in the RAM 21 in the main board 14 in correspondence with the source extension (step S3). A schedule stored in the RAM 21 is shown in FIG. 4.

The main CPU 18 detects the time data of the schedule included in the data stored in the RAM 21 and compares this time data with time indicated by the timer 19 in the main board 14 (step S4). When the time represented by the time data stored in the RAM 21 coincides with the time represented by the timer 19, the main CPU 18 drives the buzzer 37 in the extension telephone or causes the display unit 33 to display the schedule (step S5). The main CPU 18 drives the buzzer, displays a schedule on the display unit 33, or drives the buzzer and displays it on the display unit 33 in accordance with types of data.

A tone generation pattern of the buzzer 37 is set to be different from that upon reception of an incoming call.

The data registered in the electronic notebook 3 is transferred to the key telephone system, and the schedule included in the transferred data is informed by driving the buzzer 37 or displaying the schedule on the display unit 33 in the extension telephone 35.

The schedule data are stored in the RAM 21 in the main apparatus 13 in this embodiment. However, schedule data may be stored in a memory in the extension telephone 35, and the one-chip CPU 34 in the extension telephone ma perform ringing and display of the schedule. In this case, a telephone system is not limited to the key telephone system, but can be replaced with a two-wired telephone system.

The data input from the electronic notebook 3 include designation data to inform data to all extension telephones. When the main CPU 18 detects this designation data, the main CPU 18 informs all the extension telephones of a schedule on the basis of the data from one electronic notebook.

More specifically, the main CPU 18 analyzes schedule data stored in the RAM 21, reads out data of a destination extension or a group of destination extensions to which the schedule included in the schedule data is to be informed, and informs the destination extension or the group of destination extensions of the schedule in an order of extensions. When the designation of the schedule is registered as a group designation, the main CPU 18 reads out data of extensions belonging to a group from the RAM 21, and informs the extensions of the schedule in an order of extensions. A schedule is informed to all non-busy extensions.

As described above, when an operator is supposed to be away from his own seat and be in a conference room at the designated time as a schedule, a destination together with the schedule can be input, so that any extension telephone can be informed of the schedule.

A schedule is sent in units of groups of extensions. Even if a calling party or caller is not sure where he will be at time when a schedule is received, others may inform him of the schedule.

As described above, since the schedule content can be displayed, a large volume of information can be obtained.

Second Embodiment

Figure 5:
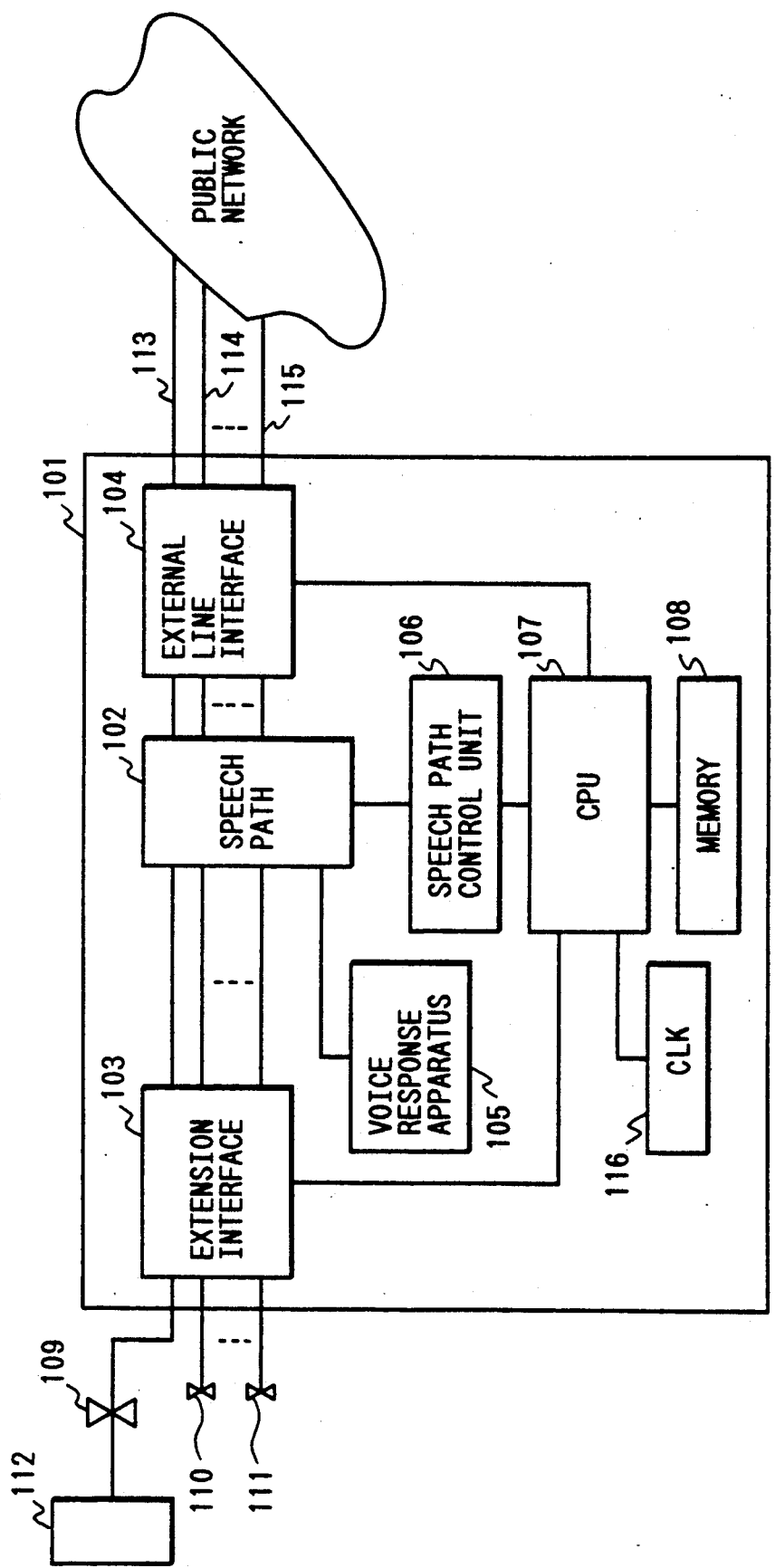
FIG. 5 is a block diagram according to the second embodiment of the present invention.

FIG. 5 is a view showing a key telephone system according to the second embodiment of the present invention. A telephone exchange main apparatus 101 includes a speech path 102, an extension interface 103, an external line interface 104, a voice response apparatus 105, a speech path control unit 106 for the external line interface 104, a central processing unit (CPU) 107, and a memory 108 for storing program data. Extension telephones 109 to 111 are connected to the main apparatus 101. A memory card 112 is connected to the extension telephone 109. External lines 113 to 115 are connected between the telephone exchange main apparatus 101 and a public network. The main apparatus 101 also includes a clock 116.

Figure 6:
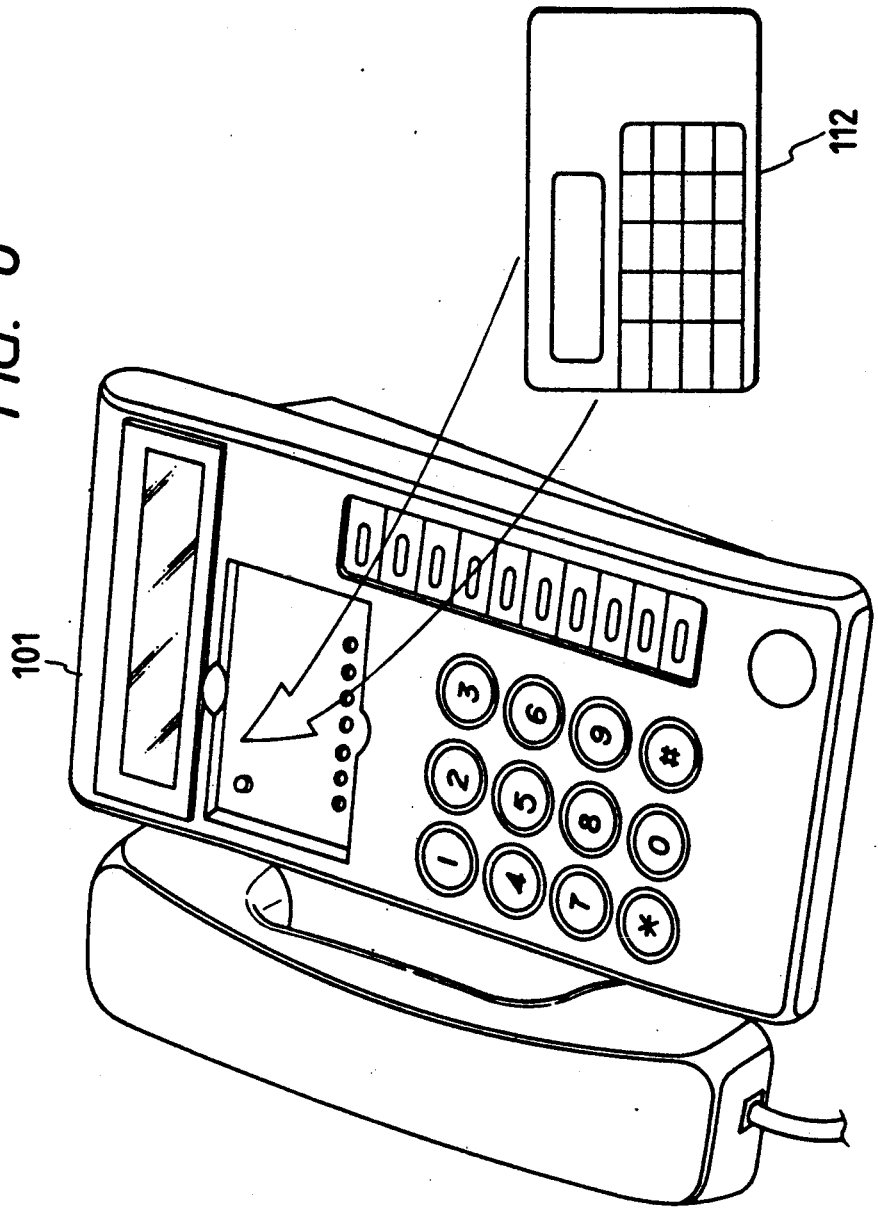
FIG. 6 is a perspective view showing an extension telephone and an electronic notebook according to the second embodiment.

FIG. 6 is a perspective view of the extension telephone and an electronic notebook (memory card). The memory card (electronic notebook) 112 has a memory, a display unit, and keys and can input, store, and display schedule data.

An operation of this embodiment will be described with reference to a flow chart of FIG. 7.

In this embodiment, when processing (e.g., DIL (Direct In-Line), DID (Direct In-word Dial), or DI (Dial-In)) for signaling an incoming call to individual extensions upon detection of the incoming call from an external line is to be executed, schedule data is read from the memory card 112 inserted into the destination extension to ring a plurality of extension telephones in accordance with the content of this schedule.

For example, when an incoming call is received from the external line 113, this is detected by the external line interface 104, and a detection signal representing the incoming call is transmitted to the CPU 107. The CPU 107 detects the in-calling or incoming call in step S120, and the flow advances to step S121.

The CPU 107 determines in step S121 whether the incoming call is a DIL (Direct In-Line) call, i.e., whether each incoming call is already registered. The memory 108 has a DIL designation registration area 130. The area 130 includes storage positions 131, 132, and 133 for storing extension numbers 10, 11, 12 of the extensions 109, 110, and 111. The storage positions 131, 132, and 133 correspond to incoming calls from the extension lines 113, 114, and 115, respectively. The CPU 107 refers to the memory 131 in step 121 since the call is received from the external line 113. Since the extension number 10 is registered in the memory 131, the CPU 107 advances to step S122 to extract the extension number 10. The CPU 107 extracts the present month, day, and time from the clock 116 in step S123, and saves them in a month, day, and time registration area 140 in the memory 108, as shown in FIG. 9. FIG. 9 is a view showing the content of the area 140 as 8 : 45, Oct. 11. The time is saved in a month and day memory 142.

In step S124, the CPU requests read access of schedule data to the extension number 10, i.e., the extension 109 via the extension interface 103. Upon reception of the schedule data read out from the memory card 112, the CPU 107 advances from step S125 to step S126 to extract the transferred one-day data. The CPU 107 compares the reception data with the data saved in the predetermined storage area of the memory 108 in FIG. 9 and saves the data representing coincidence in the month and day in an area 150 of the memory 108, as shown in FIG. 10.

When saving of one-day data is completed, the CPU 107 checks the presence or absence of a callee. The date data is stored at a memory position 151 in FIG. 10, time data is stored at a memory position 152, and the presence/absence data is stored at a memory position 153. When presence/absence data is set to "00", it represents the absence. However, when this data is set to "01", it represents the presence. A memory position 155 represents repetition of the absence and presence.

The current time is 8 : 45 according to the data stored at the memory position 142. Referring to the memory positions 152, 153, 154, and 155 of FIG. 10, a person to be called is absent between 8 : 00 and 10 : 00 and is present from 10 o'clock. Since the person is absent now, the CPU 107 executes processing in step S129.

If the person is present, the CPU 107 sends a ringing instruction or indication to the extension telephone 109 as the designated extension and waits for an extension response (step S128).

In step S129, the CPU 107 refers to a memory area 160 of the memory 108, as shown in FIG. 11 (step S129). A memory position 161 is referred to when a DIL-designated extension is absent upon reception of an incoming call from the external line 113. Data at the memory position 161 represents ringing of extensions 10 and 11 assigned with the extension numbers 11 and 12. A memory position 162 represents a storage area corresponding to the external line 114. A memory position 163 represents a storage area corresponding to the external line 115. In step S130, the CPU 107 indicates ringing of the extensions 10 and 11 and waits for the extension response.

As described above, in order to ring a specific extension upon reception of an incoming call from a given external line, schedule data in a memory card inserted into the specific extension is read out to detect a schedule (e.g., presence or absence) of a user of the destination extension. When the user is absent, a plurality of other extension telephones are caused to ring, so that any one of the callees of the plurality of other extension telephones can respond to a caller, thereby satisfying personal comfort of the caller and eliminating inconvenience of recalling.

Third Embodiment

Figure 12B:
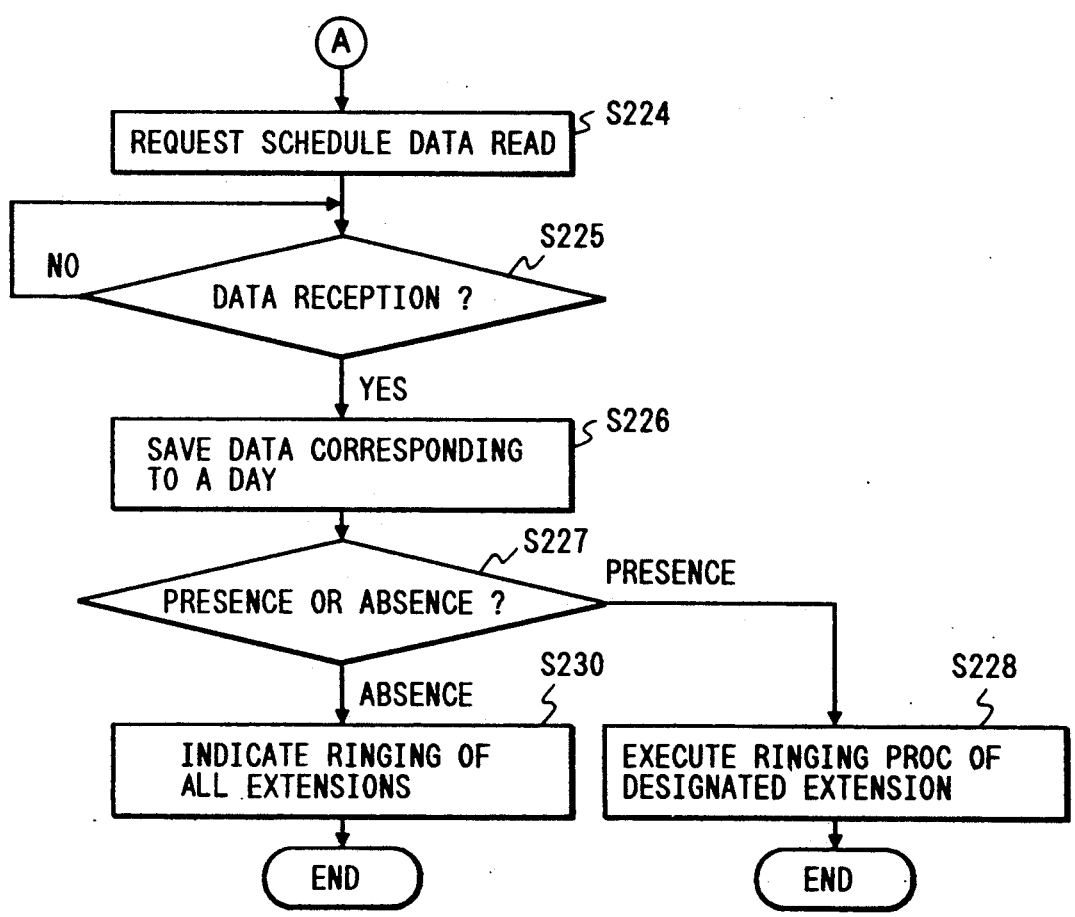

In this embodiment, when a DIL call is registered, the registered extensions are caused to ring a predetermined number of times (twice or three times). If no response is made, processing in steps S123 to S130 in FIG. 7 is performed. A flow chart of this operation is shown in FIG. 12. Note that the hardware arrangement of the third embodiment is the same as that in FIG. 5.

Referring to FIG. 12, when the CPU 107 detects reception of an incoming call from an external line (step S220), the CPU 107 checks whether DIL reception is registered for this external line (step S221). When registration of DIL reception is made, the registered designated extension is extracted from the memory 108 (step S222), and the designated extension is caused to ring (step S213).

The CPU 107 determines whether the designated extension is set in an off-hook state (step S214) or the number of times of ringing of the designate extension reaches a predetermined number (step S215). The CPU 107 connects the off-hook extension and the external line to which an incoming call is transmitted. On the other hand, when the number of times of ringing reaches the predetermined number, the flow advances to step S223. Processing from step S223 to step S228 is the same as that from step S123 to step S128 in FIG. 7. In this embodiment, in step S227, when the CPU 107 determines the absence in accordance with the schedule data, it indicates or causes to ring all the waiting extensions to allow response at all the extensions (step S230).

According to this embodiment, when a callee of the extension which receives a DIL call is absent, processing is executed in accordance with the schedule registered in a memory card 112. Therefore, if the callee is present as opposed to the schedule registered in the memory card 112, this callee can answer the phone.

Fourth Embodiment

The second and third embodiments exemplify DIL calls. However, in the fourth embodiment, a dial-in call is exemplified. The hardware arrangement of the fourth embodiment is the same as that in FIG. 5.

Figure 13B:
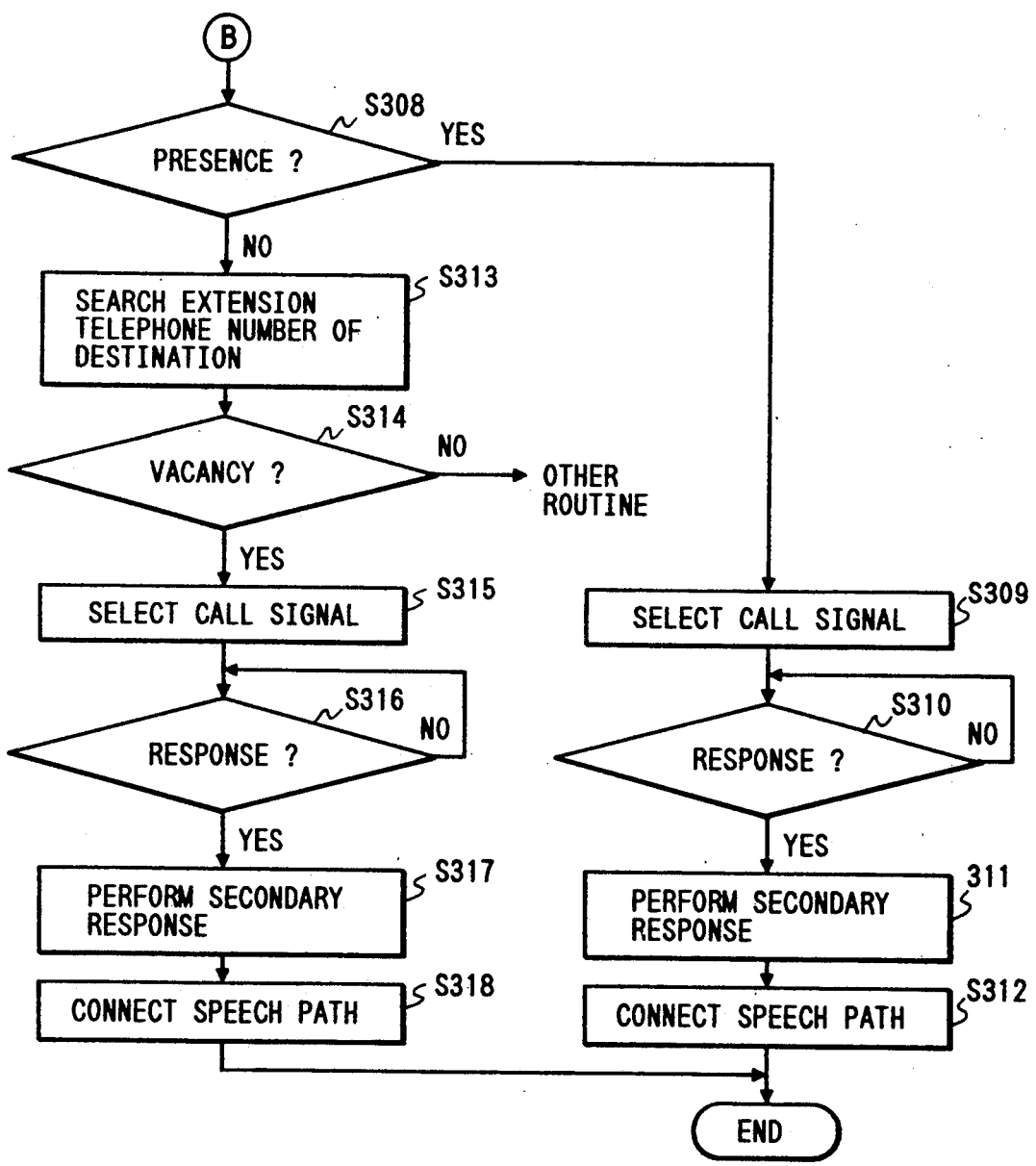

An operation of this embodiment will be described with reference to a flow chart in FIG. 13.

When an incoming call is made from an external line 113 for dial-in subscription, a CPU 107 detects this via an external line interface 104 (step S301). A DC loop forming circuit (not shown) in the external line interface 104 is closed to perform primary response to a source office exchange (not shown) of the external line 113 (step S302). When the CPU 107 receives a PB (PushButton) signal for designating an extension telephone from the office exchange (step S303), the DC loop forming circuit in the external line interface 104 is operated to temporarily open a DC circuit (step S304). The CPU 107 decodes the received PB signal and determines the designated extension telephone (step S305).

The CPU 107 refers to a memory 108 and determines vacancy (i.e., a non-busy state) of a designated extension telephone 109 (step S306). If YES in step S306, schedule data shown in FIG. 14 is read out from an electronic notebook (memory card) 112 inserted into the vacant extension telephone, and checks a schedule of the current time with reference to a clock 116 (step S307). As a result, if a callee is present now (step S308), the CPU 107 sends a call signal to the designated extension telephone (step S309). When the CPU 107 detects the response from this extension telephone (step S310), the CPU 107 closes the DC loop of the external line 113 and then sends a secondary response to the office exchange (step S311). The CPU 107 controls a speech path between the external line 113 and the designated extension telephone, thereby enabling speech communication (step S312).

On the other hand, as a result of determination in step S307, if the callee is absent, the CPU 107 searches a destination (e.g., a conference room) telephone number from the memory 108 (step S313) and sends a call signal to a conference telephone 110 (step S315). The memory 108 stores a table in which extension numbers (e.g., extension numbers of a conference room and a cafeteria) are registered. If a response is detected (step S316), the CPU 107 performs a secondary response as in steps S312 and S313 to connect a speech path between the external line 113 to the conference telephone 110 to enable speech communication (steps S317 and S318).

If a DID (Direct In-word Dial) call is detected, a secondary response in steps S311 and S316 is omitted.

When the telephone number of the external line is registered together with the schedule, the telephone number can be transferred from the external line by using a transfer telephone function. For this purpose, an external line except for the external line 113 is captured in a step in place of steps S313 and S314 in FIG. 13, and the telephone number is sent as a selection signal (dial pulse or PB (PushButton) signal).

As described above, according to this embodiment, when an incoming call (e.g., a dial-in or DID call) which designates an extension is received from an external line, if the designated user is absent due to his schedule, this incoming call can be transferred to a destination telephone set, so that this user can answer the phone. Therefore, users of extension telephones can be freely away from their desks.

Fifth Embodiment

In this embodiment, when processing for calling each individual extension upon reception of an incoming call (e.g., a DIL, DID or DI call) from an external line is to be performed, schedule data is read out from a memory card inserted into the designated extension, and a voice response is performed to the corresponding external line in accordance with a schedule content.

The arrangement of the fifth embodiment is the same as that of FIG. 5.

Figure 15:
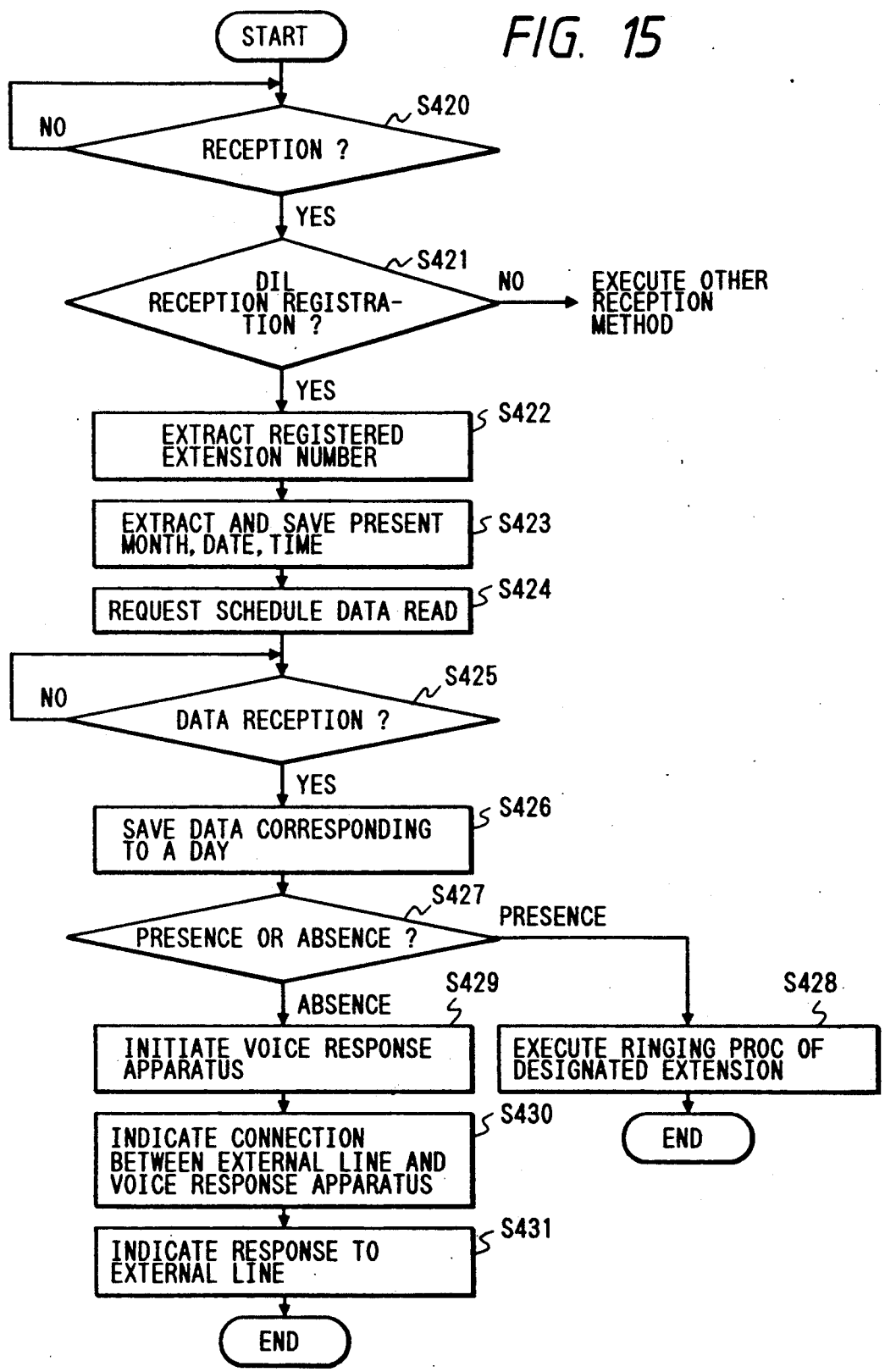
FIG. 15 is a flow chart showing an operation according to the fifth embodiment.

An operation of this embodiment is shown in a flow chart of FIG. 15. Operations in steps S420 to S428 in FIG. 15 are the same as those in steps S120 to S128 in FIG. 7. When a CPU 107 determines the absence in step S427, the CPU 107 causes a voice response apparatus 105 to start in step S429. In order to send a voice from the voice response apparatus 105 to an external line through which the incoming call is received, the CPU 107 directs it to a speech path controller 106 in step S430. Thereafter, the CPU 107 sends a response request to an external line interface 104 to indicate the response to the external line in step S431, thereby completing the processing.

As described above, when an incoming call is received from a given external line to ring a specific extension, schedule data in a memory card inserted into the specific extension is read out to detect a schedule (e.g., presence or absence) of a user of the destination extension. For example, a message representing the absence of this user is sent to a caller, thereby preventing a wasteful recall from the caller.

The voice response apparatus may be arranged in a telephone set, and a control circuit in the telephone set may determine a schedule upon reception of the incoming call, and a voice response corresponding to a determination result may be sent out.

Sixth Embodiment

In this embodiment, it is determined upon reception of a call from an external line to an individual extension whether a memory card is set in the corresponding extension telephone. If the destination extension is determined not to mount a card therein, this incoming call is received by other predetermined extension telephones. When an incoming call is sent to a telephone in which a memory card is not inserted, other telephones are caused to ring instead.

The arrangement of this embodiment is the same as that in FIG. 5. However, in this embodiment, a change signal associated with card insertion is received from each individual extension telephone via an extension interface 103, and insertion states of the cards in all extension telephones are stored in a memory 108.

Figure 16:
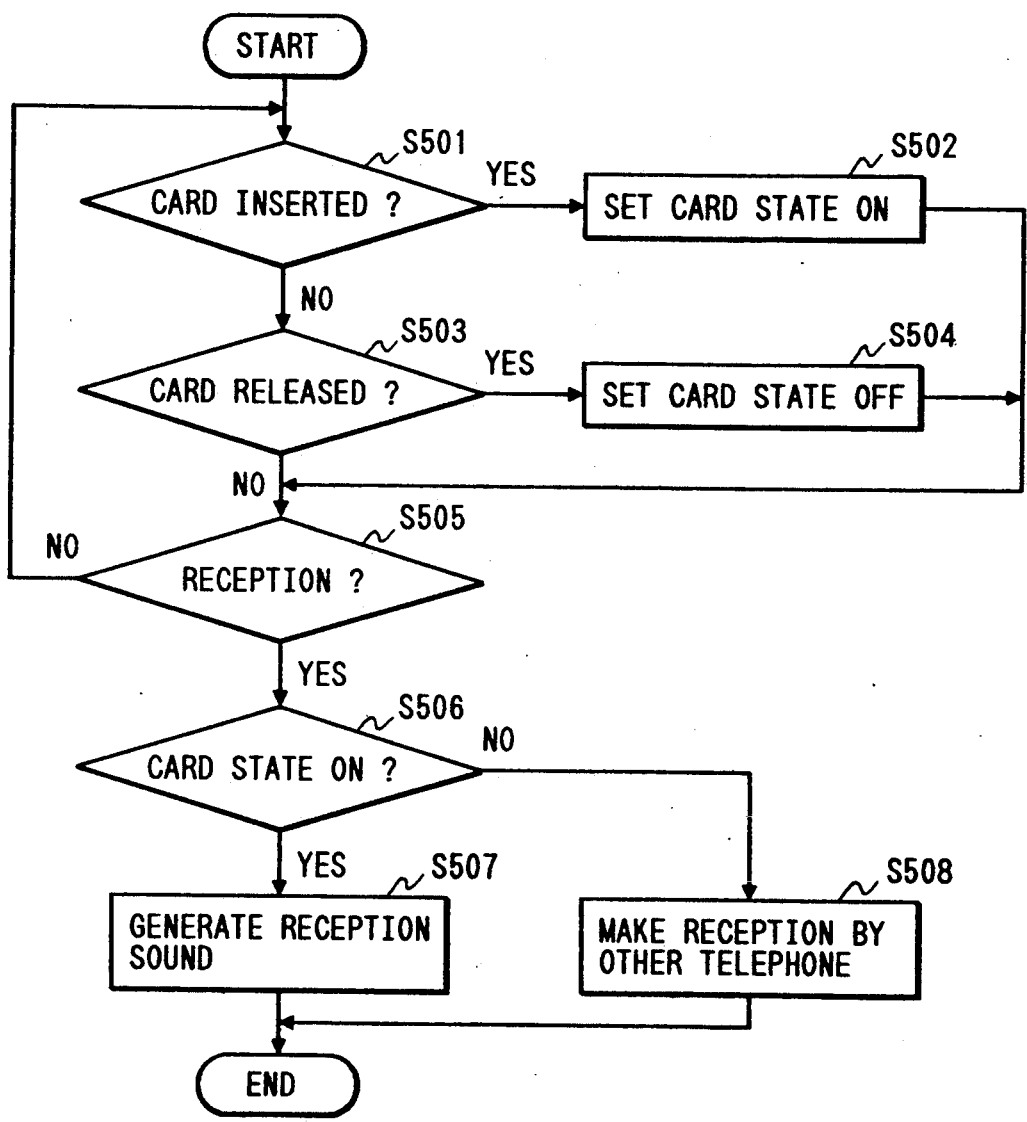
FIG. 16 is a flow chart showing an operation according to the sixth embodiment.

FIG. 16 is a flow chart showing an operation of a CPU 107 of this embodiment to be described below.

In step S501, a CPU 107 monitors a card insertion signal sent from an extension telephone via the extension interface 103 upon insertion of a card 112 into the extension telephone. When a card insertion signal is detected, the flow advances to step S502 to store a card ON state of the extension telephone in a memory 108 in step S502. However, if NO in step S501, the CPU 107 monitors a card release signal sent upon release of the card from the extension telephone. When the CPU 107 detects a card released signal, the flow advances to step S504 to store a card OFF state in the memory 108 of the extension telephone.

In step S505, the CPU 107 monitors an extension reception signal supplied from an extension line via the extension interface 104. Otherwise, operations from step S501 is repeated. When a reception signal is detected by the CPU 107, the flow advances to step S506, and the CPU 107 determines a card state in the corresponding extension telephone. If YES in step S506, the CPU 107 causes the extension interface 103 to start to generate a reception sound at the extension telephone corresponding to each reception signal in step S507. However, if NO in step S506, the CPU 107 determines that the user of the corresponding extension telephone is out, the flow advances to step S508. In this case, the incoming call is received by other telephones registered in the memory 108 in advance.

In this embodiment, an extension reception signal from the external line is detected, and the destination extension is operated. However, extensions may be caused to correspond to external lines in advance (direct in-line), and an extension may be operated upon detection of a normal reception signal.

Note that a card of this embodiment need not have a function of storing schedule data.

According to this embodiment, as described above, ringing tones are generated by other telephones in response to an incoming call to a telephone in which a card is not inserted. Even if the callee is out, the caller need not wait for a response in vein.

Seventh Embodiment

In this embodiment, it is determined whether a card is inserted into an extension upon reception of an incoming call from an external line to each individual extension. If it is determined that a card is not inserted into a given extension, a voice response is made in response to the incoming call.

The arrangement of the seventh embodiment is the same as that in FIG. 5.

Figure 17:
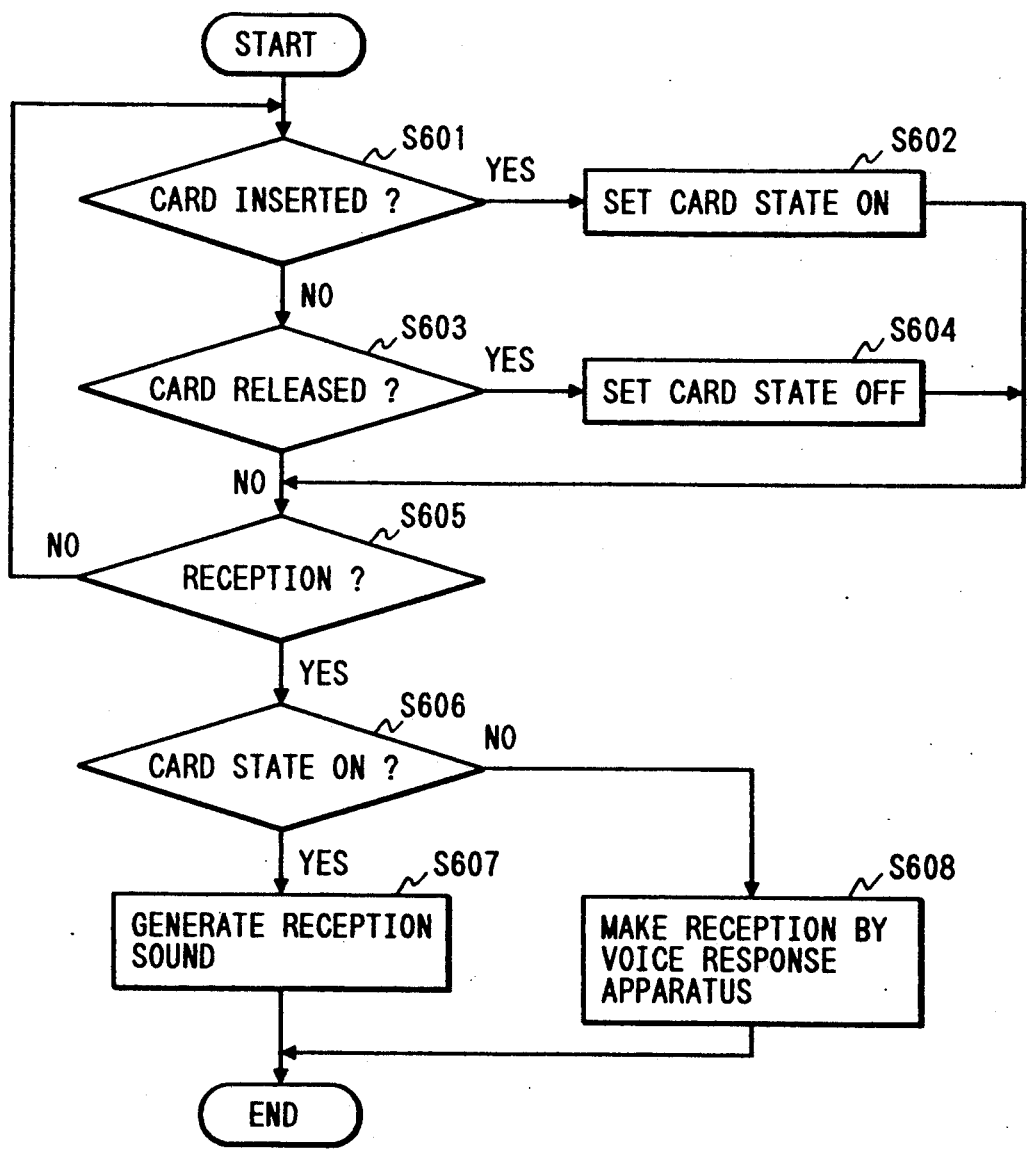
FIG. 17 is a flow chart showing an operation according to the seventh embodiment.

An operation of this embodiment is shown in FIG. 17. Operations in steps S601 to S607 are the same as those in steps S501 to S507 in FIG. 16.

When a CPU 107 determines in step S606 that a card state is OFF, the flow advances to step S608. In this step, a voice response apparatus 105 is started to send a response.

In this embodiment, each extension reception signal from an external line is detected, and the corresponding extension is operated. However, extensions may be caused to correspond to extension lines (direct in-line) in advance, and the extension may be operated upon reception of a normal reception or incoming signal. In this embodiment, a card need not store schedule data.

The voice response apparatus may be arranged in a telephone set, a telephone control circuit may determine the presence/absence of a card upon reception of an incoming call, and a voice response may be made on the basis of a determination result.

As described above, according to this embodiment, the voice response apparatus sends a response in response to an incoming call to a telephone set into which a card is not inserted. Even if a destination user is out, the caller need not wait for a response in vein.

Eighth Embodiment

Upon reception of an incoming call which designates a specific extension, it is determined whether a card which stores a schedule is set in the designated extension telephone. If not, the incoming call is received by an extension telephone in which the schedule is set in a memory 108. Otherwise, the schedule is read out form the card of the specific extension, and processing corresponding to the readout schedule is executed.

The arrangement of the eighth embodiment is the same as that in FIG. 5.

Figure 18:
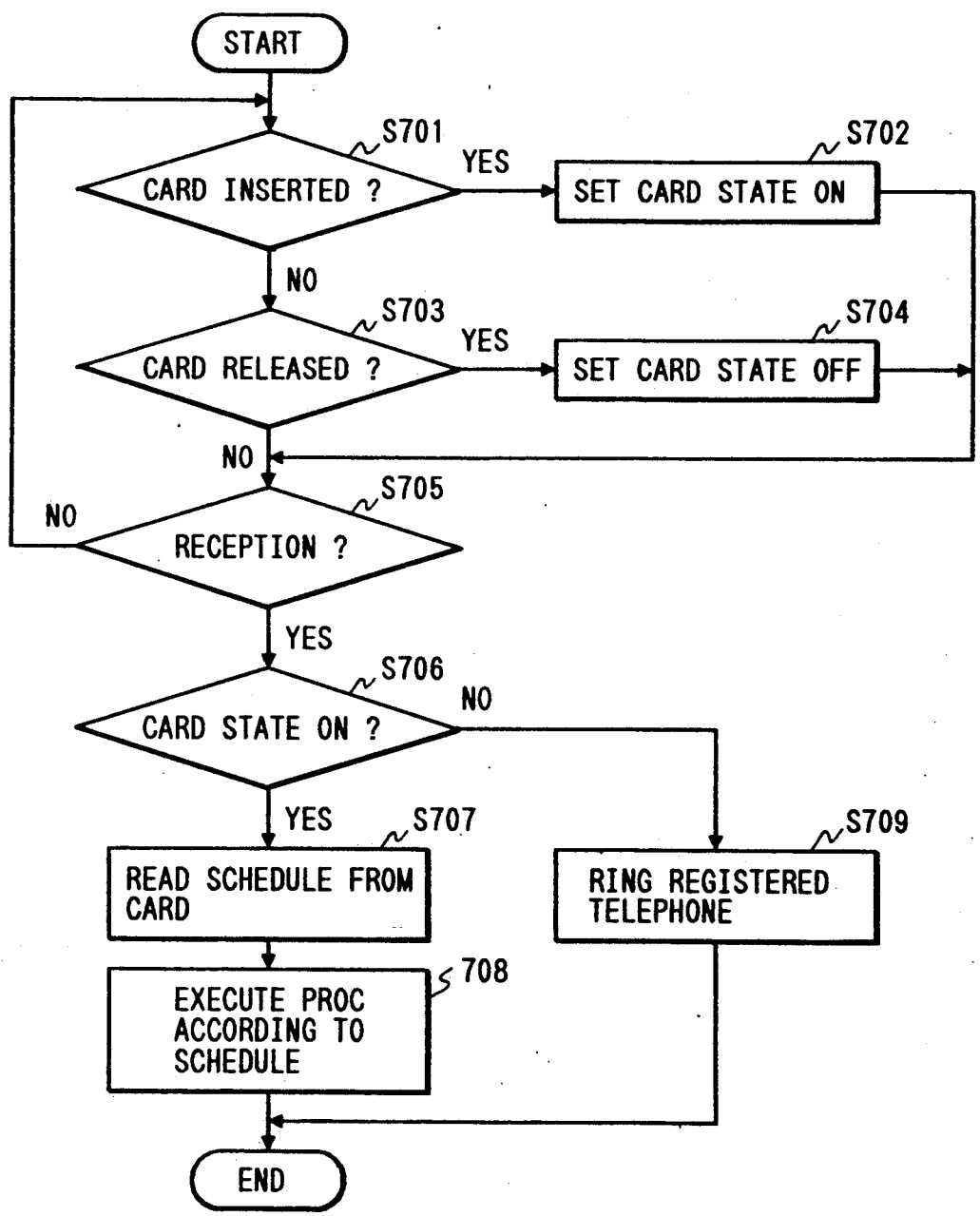
FIG. 18 is a flow chart showing an operation according to the eighth embodiment.

An operation of this embodiment is shown in a flow chart of FIG. 18. Operations in steps S701 to S706 in FIG. 18 are the same as those in steps S501 to S506 in FIG. 16.

When a CPU 107 determines in step S706 that a card is inserted into an extension, a schedule is read out from the card in step S707. Processing corresponding to the schedule read out in steps S708 and current time read out from a clock 116 is performed. More specifically, if a callee is present, the corresponding extension is caused to ring. When a transfer destination extension is registered, it is caused to ring. In addition, when a voice response is registered, the voice response apparatus 105 is started to send a voice response.

When the CPU 107 determines in step S706 that a card is not inserted, extension telephones registered in a memory 108 are caused to ring in step S709. The memory 108 prestores an extension adjacent to the extension designated by the external line. Alternatively, the extension designated by the external line may be caused to ring. The extension telephone number can be registered in the memory 108 at a keyboard of the extension telephone or a card.

Ninth Embodiment

In this embodiment, a schedule is transferred from a card 112 to a memory 108 in advance. Even if the card 112 is released from the extension telephone, processing can be performed in accordance with the schedule registered in the card 112.

The arrangement of the ninth embodiment is the same as that in FIG. 5.

An operation of this embodiment is shown in FIG. 19. Operations in steps S801 to S805 in FIG. 19 are the same as those in steps S301 to S305 in FIG. 13.

When a CPU 107 determines a designated extension telephone in step S805 the CPU 107 reads out schedule data of a user of the designated extension telephone from the memory 108. If a callee is present at his desk where the designated extension is placed (step S808), the CPU 107 determines a vacant (non-busy) state of the designated extension telephone (steps S806). If the designated extension is vacant or not busy, the designated extension telephone is called (step S809). When the CPU 107 detects a response (step S810), the CPU 108 sends a secondary response to an office exchange (step S811) and connects a speech path between an external line 113 and the designated extension telephone (step 812).

When the schedule data is read out in step S807 and represents that the callee is out (step S808), the CPU 107 reads out a destination from the memory 108 (step S813). If the destination is a conference room, the CPU 107 checks an extension number of the conference room from the memory 108 and detects whether the telephone of the conference room is not busy (steps S814). If YES in step (S814), the telephone of the conference room is called (step S815). When a response is detected (step S816), the CPU 107 forms a DC loop of an external line 113 to perform a secondary response to the office exchange (step S817). At the same time, a speech path between the external line 113 and the telephone of the conference room is connected to allow speech communication (step S818).

Note that the schedule is registered such that a card is set in an external telephone in advance and the schedule registered in the card in advance is transferred to the memory 108. The schedule may be input from an operation unit of the extension telephone. When extension numbers are input together with the schedule, different schedules of extension telephones can be registered from other extension telephones.

This embodiment exemplifies a dial-in call. However, steps S802, S803, and S804 are omitted for a DIL call, and a response is sent to the office exchange in steps S811 and S817.

The secondary response in steps S811 and S817 may be omitted for a DID call.

When a schedule is registered together with telephone numbers, an external line call can be transferred using a transfer telephone function. For this purpose, an external line except for the external line 113 is connected in steps S814 and S815 in FIG. 19, and a telephone number is sent as a selection signal (i.e., a dial pulse or a PB signal).

As described above, according to this embodiment, an incoming call (e.g., a dial-in, DIL, or DID call) for designating a specific extension is received from an external line, even if a user of the designated extension telephone is out, the incoming call can be transferred to the transfer destination telephone. Therefore, extension telephone users can be freely out without any anxiety.

Tenth Embodiment

In this embodiment, when an incoming call is made to a specific extension telephone from another extension telephone, processing is performed in accordance with schedule data transferred from a card 112 to a memory 118 through the destination extension telephone, i.e., the specific extension telephone.

An operation of the CPU 107 which is performed when a call is made from an external telephone to another external telephone will be described with reference to FIG. 20. The CPU 107 reads the current date and time from a clock 116 in step S901 of FIG. 20. In step S902, the CPU 107 reads out a schedule (FIG. 21) of the called telephone from a memory 108. In step S903, the CPU 107 compares the time data obtained in step S901 with the schedule data obtained in step S902. The CPU 107 performs determination in step 904. As a result of determination, the flow is branched into step S905, S906, S907, or S908.

When the callee is out as a result of comparison by the CPU 107, the flow is branched into step S905. The CPU 107 connects a voice response apparatus 105 to the source telephone set and sends a message of absence because of going out to the source telephone set. The CPU 107 restores exchange processing in step S913.

When the schedule represents a vacation as a result of comparison in step S904, the flow is branched into step S906 to connect the voice response apparatus 105 to the source telephone so that a message of absence because of a vacation to the source telephone. The CPU 107 returns to exchange processing in step S913.

When the comparison result in step S904 represents schedule transfer, the flow is branched into step S907. The CPU 107 sends a call signal to the telephone having the transfer destination extension number in step S911 and sends an in-calling message to the source telephone. The CPU 107 returns to exchange processing in step S913.

If no schedule representing absence or transfer is present as a result of comparison in step S904, the flow is branched into step S908. The CPU 107 outputs a call signal to the destination telephone and an in-calling message to the source telephone in step S912.

As a speech path for exchanging data between the electronic notebook (memory card) and its telephone, an optical speech path, an electromagnetic speech path, a weak radio wave speech path, or a direct coupling speech path using a connector may be used.

The messages to be sent to the source telephone may be displayed as character or voice messages.

As described above, according to this embodiment, the system is organized and operated on the basis of the schedules of the extension telephones in the operation of the key telephone system while the schedules of the respective extension telephones are checked. Therefore, better services for key telephone systems can be offered.

As described above, according to the above embodiment, reception control corresponding to user schedules can be performed.

Even if a callee is out, the caller need not wait for a response in vein, and others can answer the phone. In addition, this embodiment can cope with a busy callee who is moving as time goes by.

Eleventh Embodiment

In this embodiment, schedule data received from a plurality of electronic notebooks are stored, and all the schedule data are simultaneously output, thereby managing the plurality of electronic notebooks.

Figure 22:
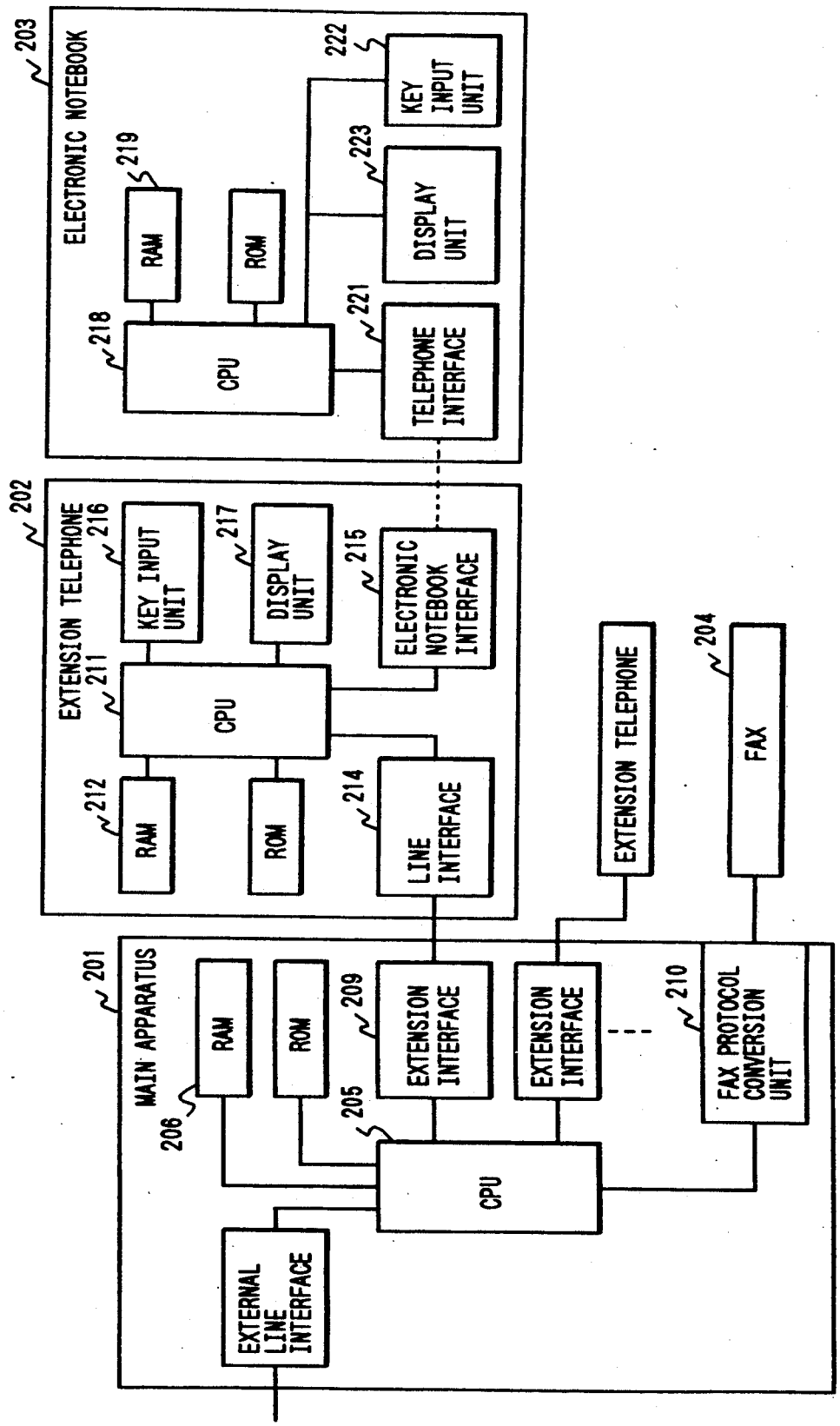
FIG. 22 is a block diagram showing a system according to the eleventh embodiment.

FIG. 22 is a block diagram of a system according to the eleventh embodiment of the present invention. A main apparatus 201 of a telephone exchange system is connected to an extension telephone 202. A card-like electronic notebook 203 can be connected to the extension telephone 202. A facsimile apparatus 204 is connected to the main apparatus 201. The main apparatus 201 includes a main processing unit (CPU) 205, a RAM 206 serving as a memory controlled by the CPU 205, an extension interface 209 serving as an interface with the extension telephone 202 connected to the main apparatus 201, and a facsimile (FAX) protocol conversion unit 210 for converting a program into a facsimile protocol when the main apparatus 201 communicates with the facsimile apparatus 204. The extension telephone 202 includes a CPU 211 serving as a main processing unit of the extension telephone 202, a RAM 212 serving as a memory controlled by the CPU 211, a line interface 214 for interfacing with the main apparatus 201 connected to the extension telephone 202, and an electronic notebook interface 215 serving as an interface for the electronic notebook 203 detachably inserted into the extension telephone 202 to transmit a transmission request of schedule data. The extension telephone 202 also includes a key input unit 216 for causing an extension telephone user to input information to the extension telephone 202, and a display unit 217 for displaying information output from the extension telephone 202 to its user. The electronic notebook 203 includes a CPU 218 serving as a main processing unit of the electronic notebook 203, a RAM 219 serving as a memory controlled by the CPU 218, a telephone interface 221 serving as an interface for the extension telephone 202 connected to the electronic notebook 203, a key input unit 222 for an electronic notebook user to input information to the electronic notebook 203, and a display unit 223 for outputting information from the electronic notebook 201 to its user.

Figure 23:
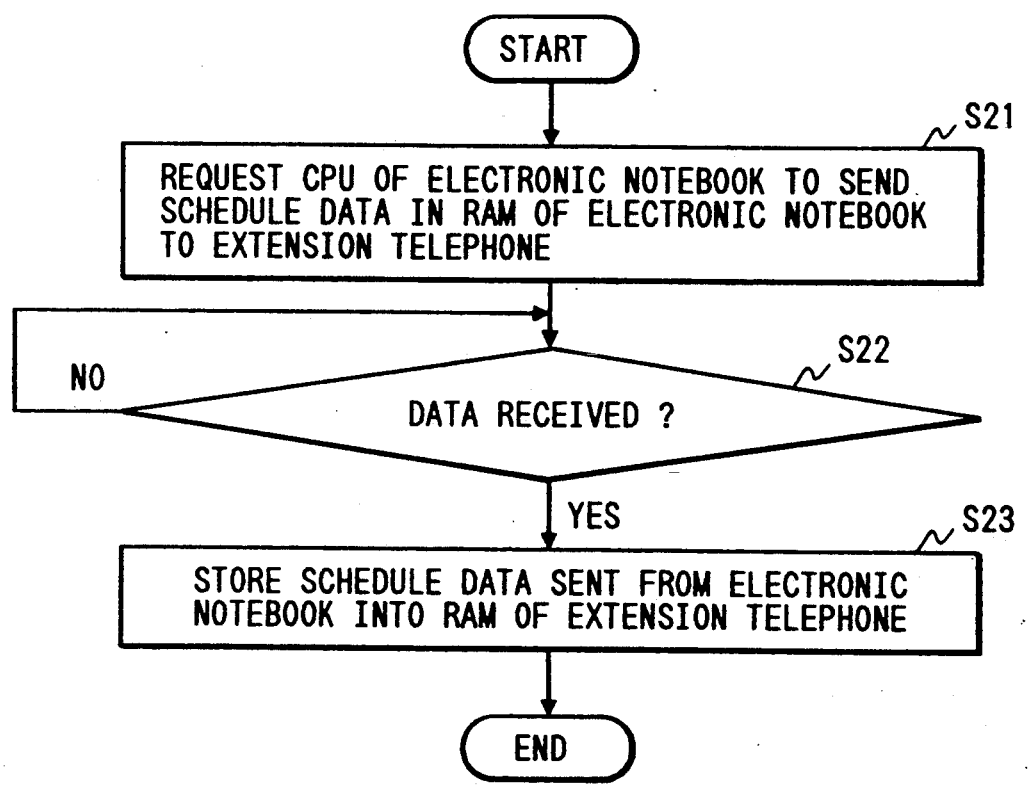
FIG. 23 is a flow chart for explaining an operation for reading schedule data of an extension telephone according to the eleventh embodiment.

A flow chart of writing schedule data in the extension telephone 202 in this embodiment is shown in FIG. 23.

The user of the extension telephone 202 sets the electronic notebook 203 in the telephone 202 and designates read access of schedule data to the electronic notebook 203 at the key input unit 216. The CPU 211 transmits a schedule transmission request from the electronic notebook interface 215 (step S21), when the schedule data transmission request is received via the extension telephone interface 221. The CPU 218 in the electronic notebook 203 transmits the schedule data in the RAM 219 to the extension telephone 202 via the telephone interface 221. When the CPU 211 in the extension telephone 202 receives the schedule data and an extension number via the electronic notebook interface 215 (step S22), the schedule data and extension number are stored in the RAM 212 (step S23).

Figure 24:
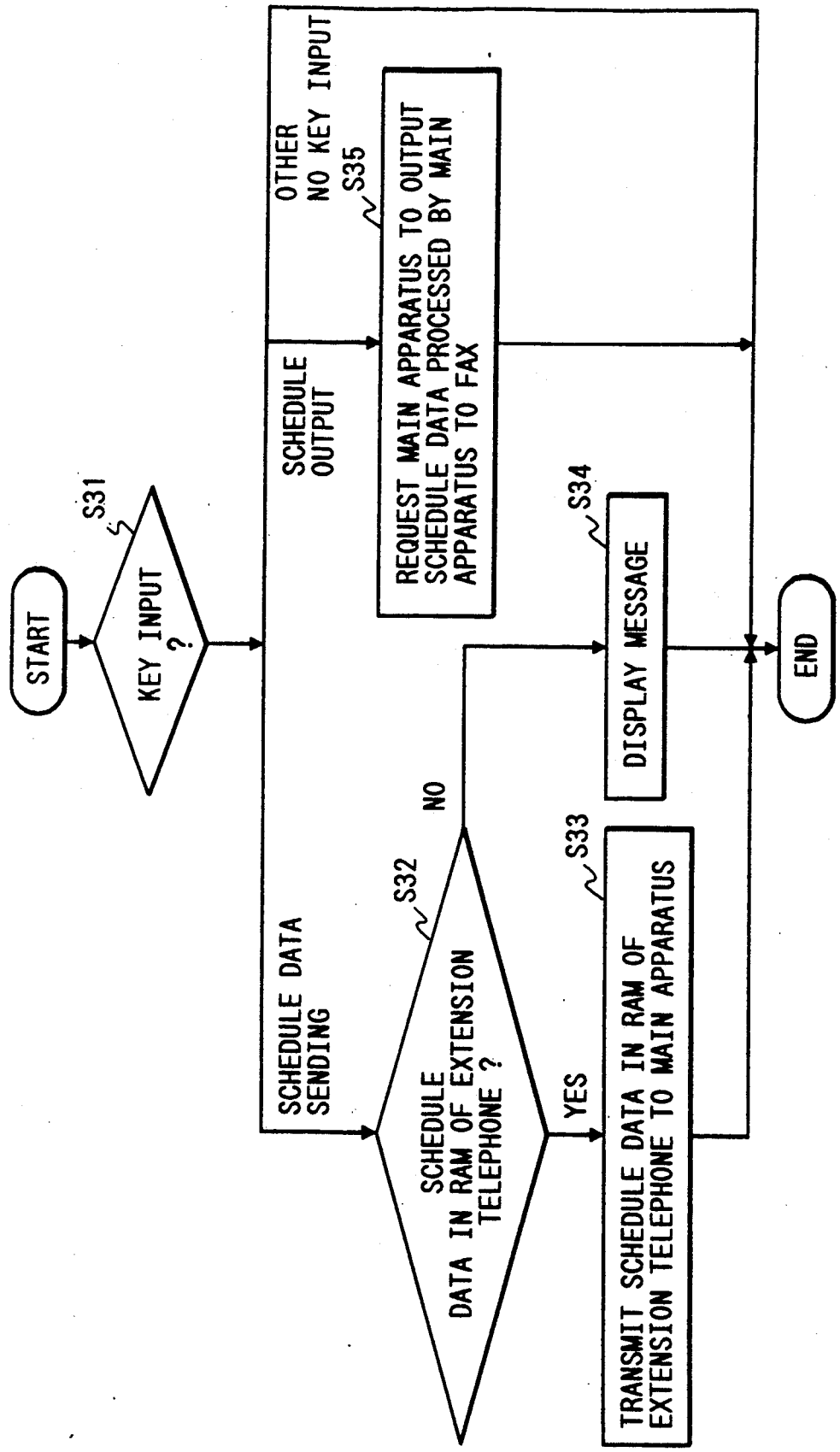
FIG. 24 is a flow chart for explaining an operation for editing a schedule of the extension telephone according to the eleventh embodiment.

Schedule editing of the extension telephone in this embodiment is shown in a flow chart of FIG. 24.

When the user of the extension telephone 202 inputs schedule data transmission request to the main apparatus 201 via the key input unit 216 (step S31), the CPU 211 transmits schedule data in the RAM 212, if any, to the main apparatus 201 via the line interface 214 (step S33). On the other hand, when no schedule data is present in the RAM 212, the CPU 211 causes the display unit 217 to display a message without any schedule data (step S34).

Figure 25:
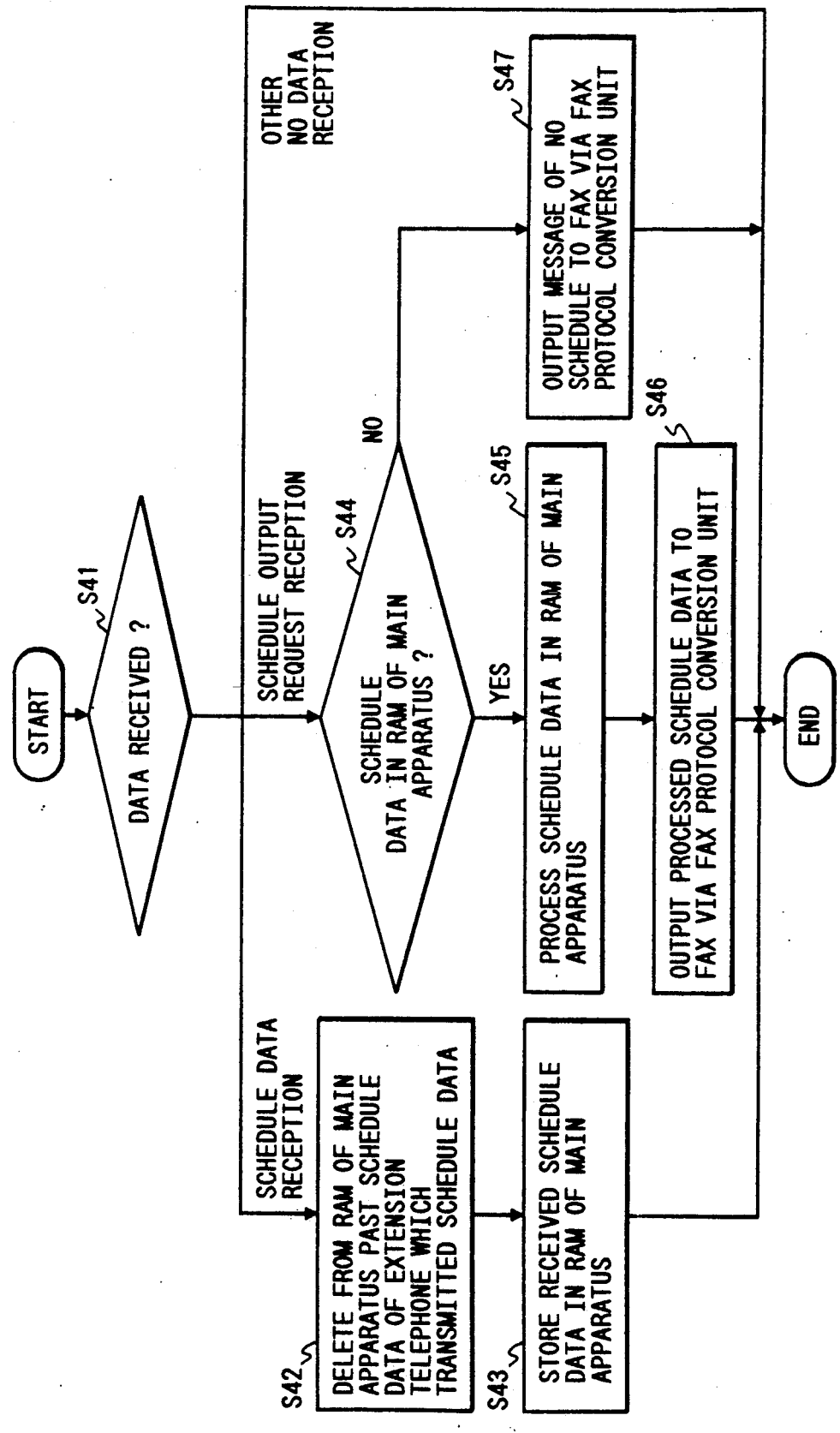
FIG. 25 is a flow chart for explaining an operation for editing a schedule of a main apparatus according to the eleventh embodiment.

A flow chart of schedule editing of the main apparatus 201 of this embodiment is shown in FIG. 25.

When the CPU 205 in the main apparatus 201 receives the schedule data from the extension telephone 202 via the extension interface 209 (step S41), the past schedule data of the extension telephone 202 which is prestored in the RAM 206 is deleted (step S42), and new schedule data is stored (step S43). In this case, schedule data of other extension telephones are kept preserved in the RAM 206.

When the user of the extension telephone 202 inputs via the key input unit 216 a request for outputting schedule data to the facsimile apparatus 204, the CPU 211 sends the request to the main apparatus 201 via the line interface 214 (step S35). When the request is received from the extension telephone 202 via the extension interface 209, the CPU 205 of the main apparatus 201 edits schedule data, if any, in the RAM 206 (step S44) in step S45 on the basis of the time and name. The edited data is sent to the facsimile protocol conversion unit 210. The facsimile protocol conversion unit 210 converts the edited schedule data into data complying with a facsimile protocol. The converted data is sent to the facsimile apparatus 204 connected to the extension (step S46). On the other hand, when no schedule data is present in the RAM 204, and when no schedule data is present via the facsimile protocol conversion unit 210, the CPU 205 transmits a message without any schedule data via the facsimile protocol conversion unit 210 (step S47). In this case, this message may be displayed on the telephone which transmitted the schedule output request.

FIG. 26 shows a schedule output result. When individual names are assigned to the respective extension telephones and are registered, outputs can be obtained in units of personal names, as shown in FIG. 26.

In this embodiment, without arranging an additional output unit, a list of a personal schedule of each extension telephone connected to the main apparatus 201 can be quickly formed since the facsimile machine connected to the extension is used as a schedule output unit.

When a specific extension number is input together with the schedule data request from the key input unit 216 of the extension telephone 202 to the main apparatus 201, the CPU 205 reads out the user schedule of the specific extension from the corresponding RAM 206 and transmits the readout schedule to the facsimile apparatus 204.

The CPU 205 detects the current time from the built-in clock and reads out schedules of the specific extension from the ones close to the current time from the RAM 206 and causes the display unit 217 to sequentially display the schedules in order. In this manner, necessary schedules can be known on the display unit of the accessible telephone.

Instead of managing extension numbers, identification numbers are assigned to the electronic notebooks 203, and the identification numbers of the olectronic notebooks can be managed in the RAM 206 together with the schedules.

In this embodiment, transfer of the schedule data from the electronic notebook 203 and transfer of schedule from the extension telephone 202 to the main apparatus 201 are performed by independent commands input at the key input unit 216. However, when the CPU 211 of the extension telephone 202 detects that the schedule is transferred from the electronic notebook 203, the schedule may be transferred to the main apparatus 201 without waiting a command input by the operator.

Twelfth Embodiment

Figure 27:
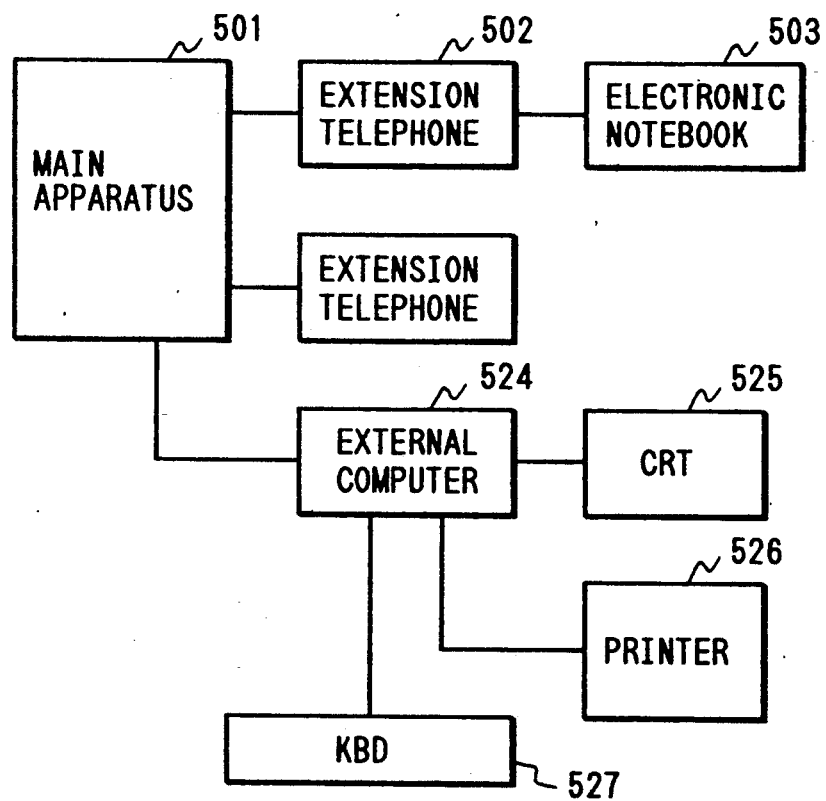
FIG. 27 is a block diagram showing a system according to the twelfth embodiment.

FIG. 27 shows an arrangement of the twelfth embodiment. This system includes a main apparatus 501, an extension telephone 502 connected to the main apparatus 501, a card-like electronic notebook 503 connected to the extension telephone 502, an external computer 524 connected to the main apparatus 501, a CRT (display) 525 serving as an output unit of the external computer 524, a printer 526 serving as another output unit of the external computer 524, and a keyboard 527 serving as an input unit of the external computer 524.

The external computer 524 is connected to the main apparatus 501 to cause the external computer 524 to perform schedule data editing. The CRT 527 and the printer 526 are used in place of the facsimile apparatus as schedule output units.

In the same sequence as in the previous embodiment, schedule data transmitted from the electronic notebook and stored in the main apparatus 501 is transmitted to the external computer 524 by the main apparatus 501 in response to a schedule data editing start request input via the keyboard 527. The external computer 524 edits the received schedule data in accordance with the editing request input via the keyboard 527. The edited data is output to the CRT 526 and the printer 527.

In this embodiment, since the schedule data is edited by the external computer, the schedule data can be freely utilized such that an output format can be changed, and any other processing using the schedule data can be performed.

In this embodiment, schedules are managed by the main apparatus in the exchange system. However, a plurality of electronic notebooks may be managed by a single telephone. Alternatively, a special schedule management apparatus may be used in place of the telephone.

As described above, a schedule editing function obtained upon connection of an electronic notebook is assigned to the telephone exchange apparatus. The schedule data in the electronic notebook can be effectively utilized. The schedule data of all personally managed electronic notebooks of the users of extensions connected to a single main apparatus can be systematically managed, and schedule editing output can be facilitated.

Thirteenth Embodiment

Figure 28:
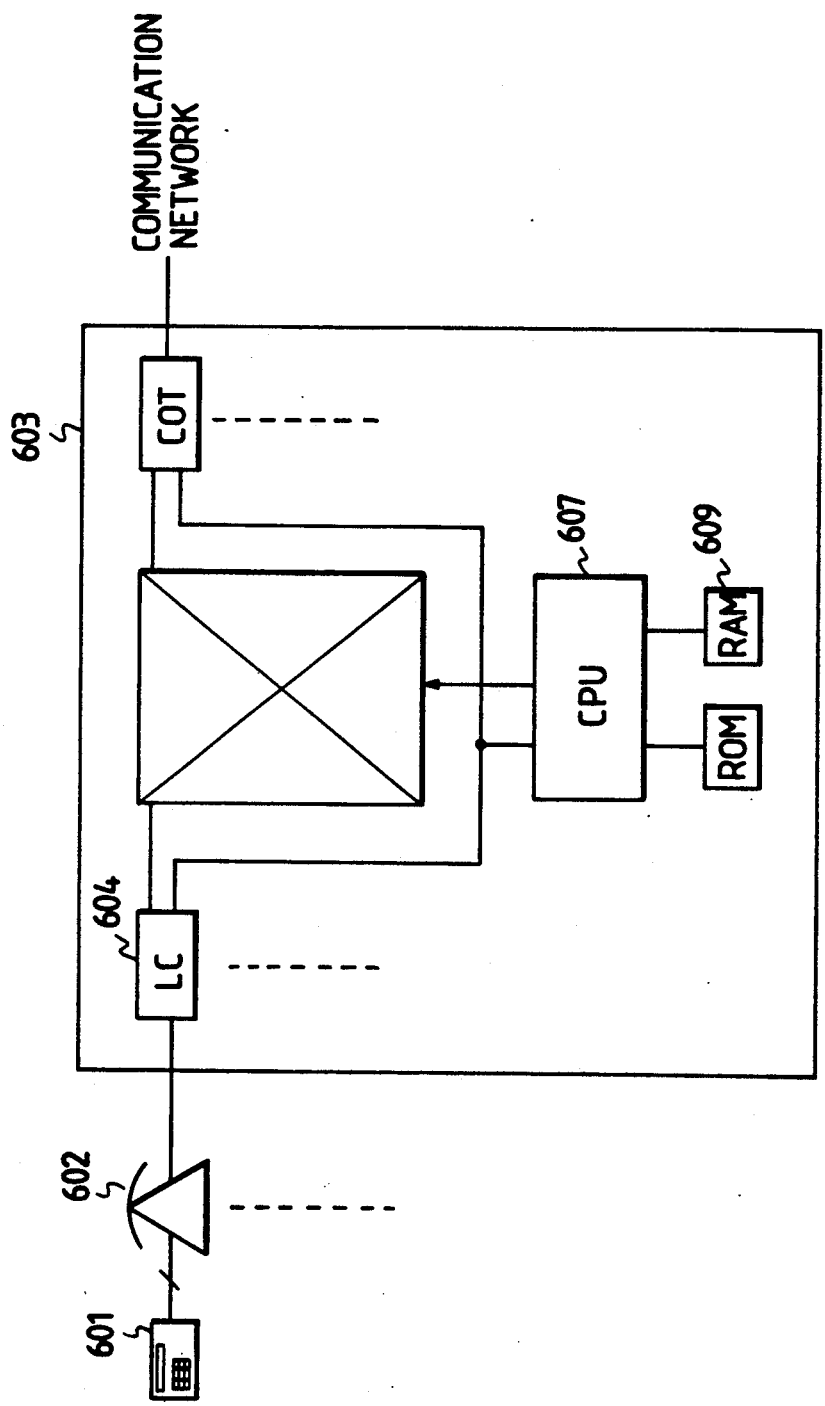
FIG. 28 is a block diagram showing a system according to the thirteenth embodiment.

FIG. 28 is a block diagram showing an overall arrangement of a key telephone system. This system includes a card-like electronic notebook 601, an extension telephone 602, a main apparatus 603, an extension telephone interface (LC) 604, a CPU 607, and a RAM 609.

Figure 29:
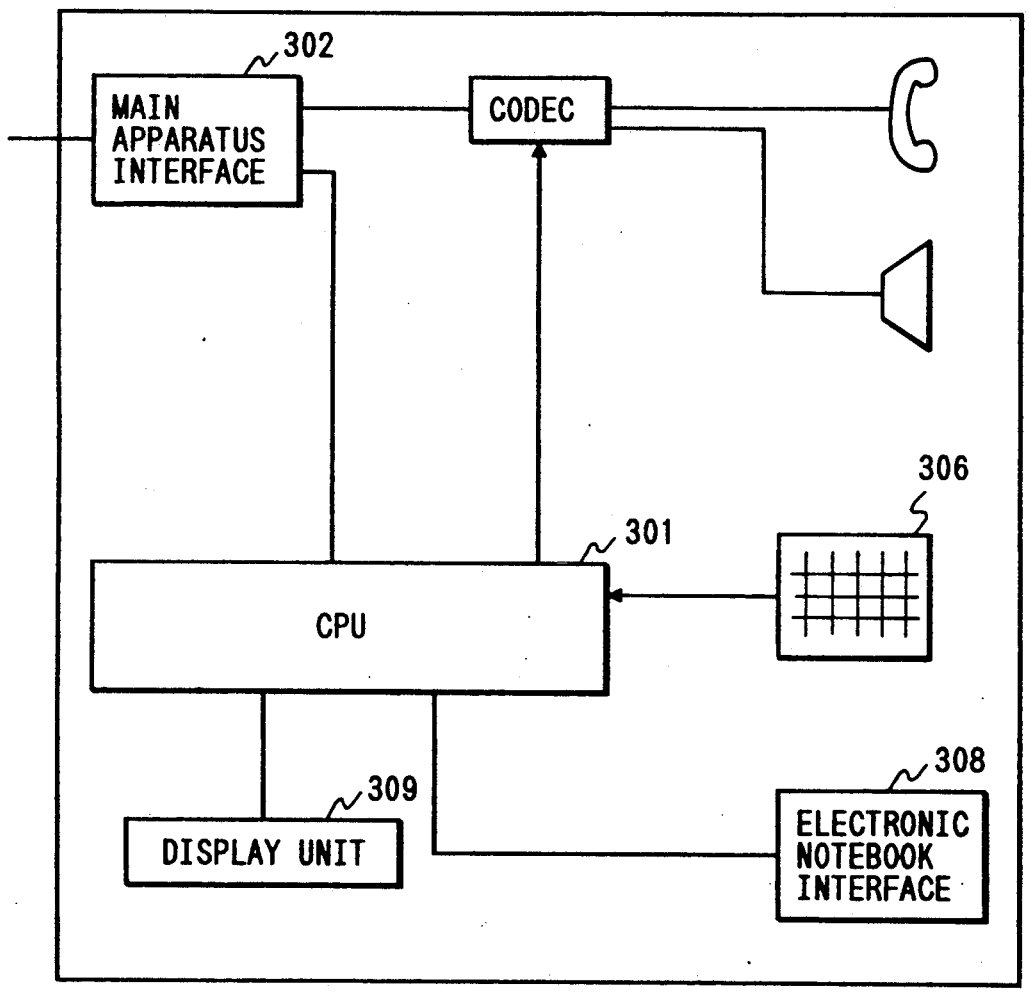
FIG. 29 is a block diagram showing a telephone set according to the thirteenth embodiment.

FIG. 29 is a block diagram of an arrangement of the extension telephone of this embodiment. The extension telephone includes a CPU 301 incorporating a ROM (Read-Only Memory) and a RAM, a main apparatus interface 302, keys 306, an electronic notebook interface 308, and an LCD (Liquid Crystal Display) unit 309.

FIG. 30 is a perspective view of the extension telephone 602 and the electronic notebook 601 in the key telephone system of this embodiment. The extension telephone 602 has an electronic notebook mounting portion for mounting the electronic notebook 601 and a schedule data transfer key 304 for transferring schedule data from the electronic notebook 601.

Figure 31B:
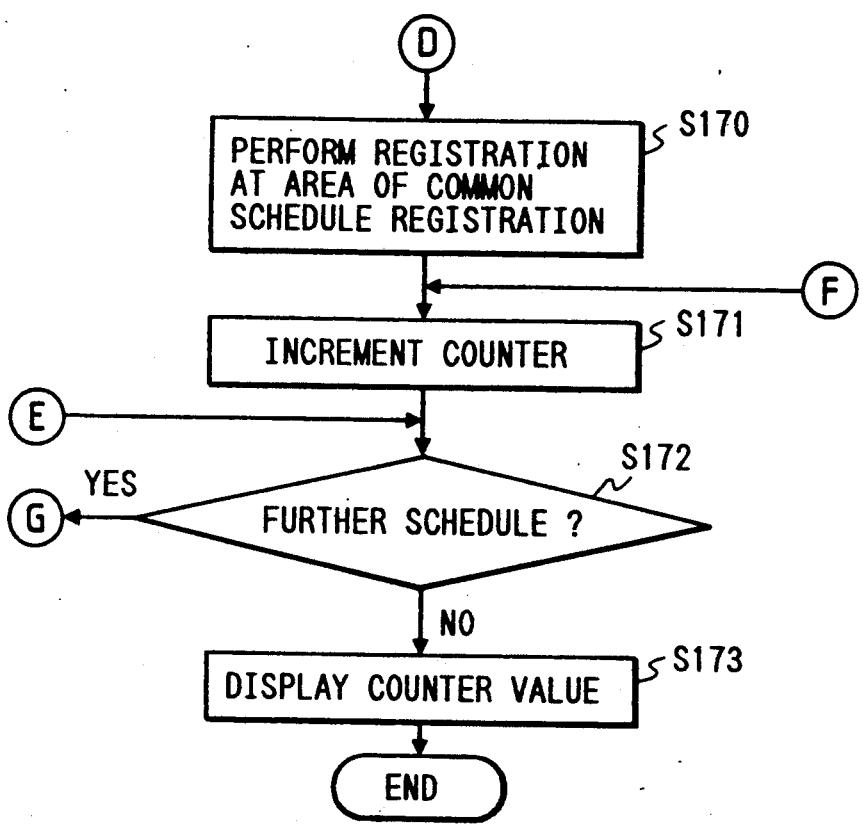
Figure 32:
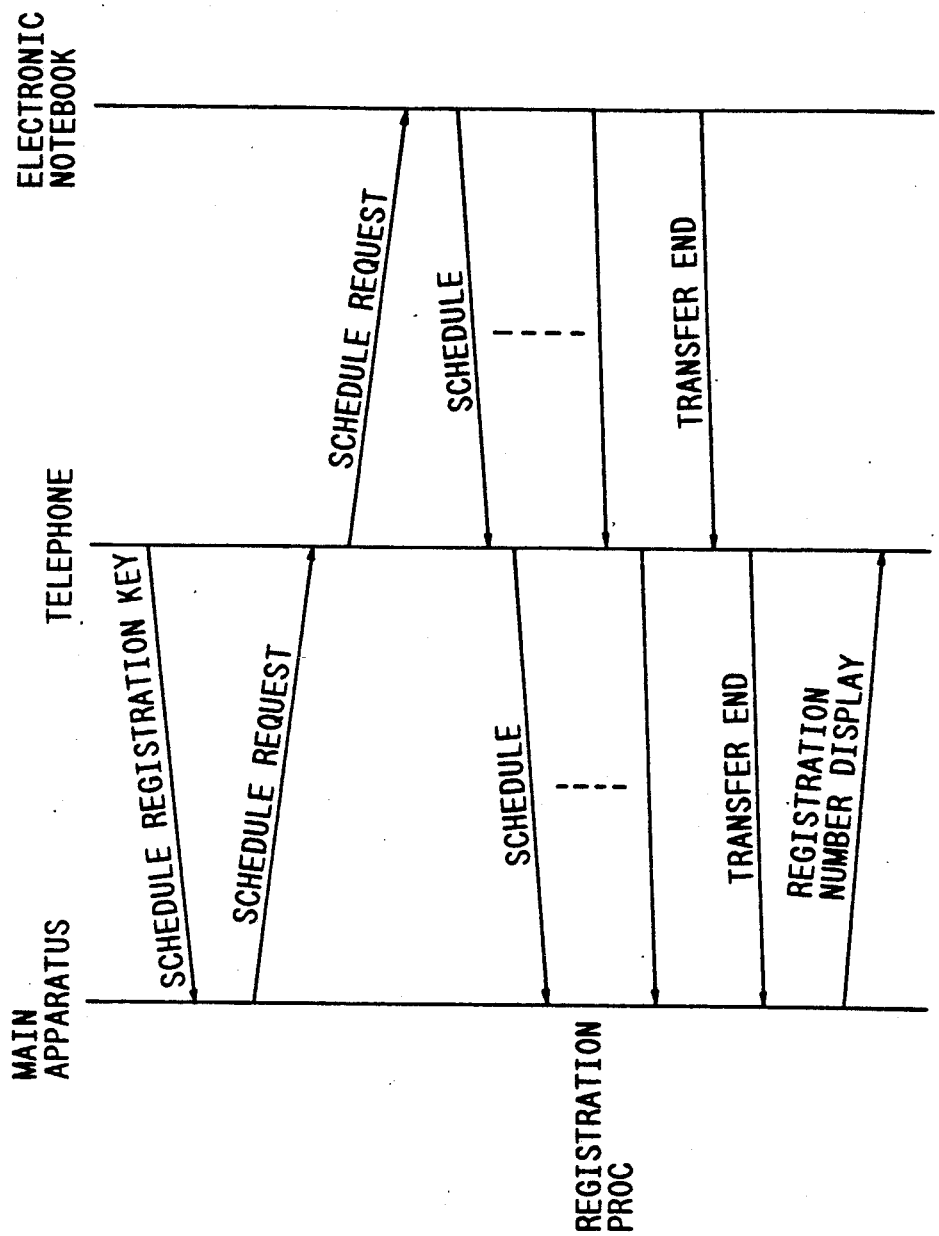
FIG. 32 is a sequence chart of schedule data registration according to the thirteenth embodiment.
Figures 35A, 35B:
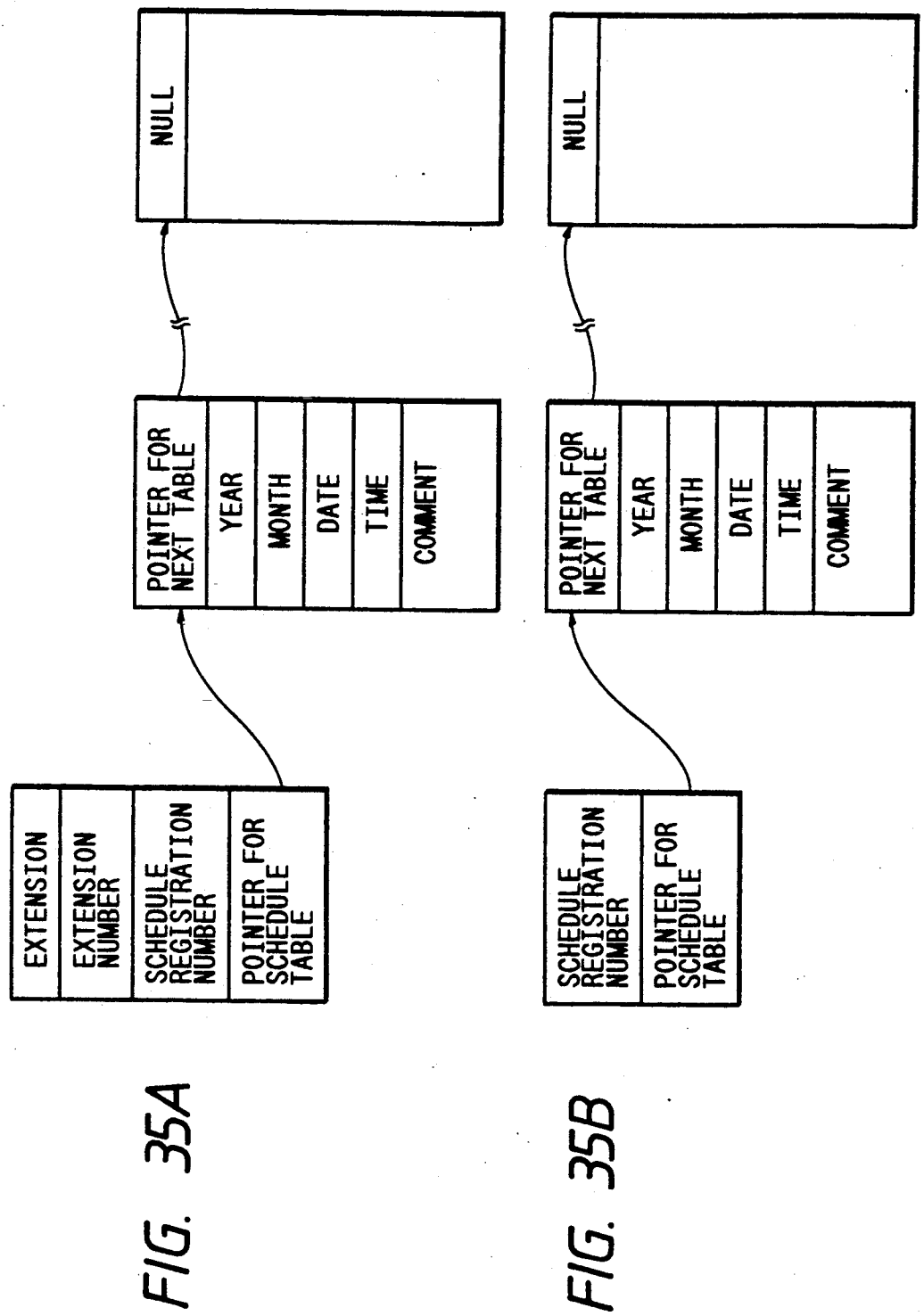
FIGS. 35A and 35B are charts showing schedule data registration memories according to the thirteenth embodiment.

FIG. 31 is a flow showing schedule data registration processing of this embodiment. FIG. 32 is a sequential chart for registering schedule data. FIG. 34 shows a transfer format of schedule data output from the electronic notebook. The data are transferred in an order of year, month, day, time, an escape code (if any), and a comment associated with the schedule from the electronic notebook 601. FIGS. 35A and 35B show personal schedule data registration memories. FIG. 35A shows a personal schedule data registration memory arranged for each extension. One extension setting memory is available. This memory has pointers representing schedule registration number and a start address of the schedule registration memory. The schedule registration memory consists of a pointer representing the next schedule registration memory, and year, month, day, time, and a comment. A code (NULL code) as a pointer which does not represent any destination of the next memory of the last schedule registration memory is set. Schedule data are sorted from old year, month, day, and time data. FIG. 35B shows a common schedule data registration memory comprising memories each consisting of a common schedule data registration number and a pointer representing a start schedule data registration memory. The structure of each schedule data registration memory is the same as that in FIG. 35A.

FIG. 33 shows a correspondence between escape codes and the schedule types. The type of schedule data received from the electronic notebook 601 is recognized in units of character patterns of the escape codes. Each escape code is located at the escape code position in the schedule data transfer format in FIG. 34. If ¥0 is set in this position, it indicates data which cannot be registered in the schedule registration memory of this key telephone system. When ¥1 is set, the transferred schedule data can be registered in the personal schedule data registration memory (FIG. 35A). If ¥2 is set, the transferred schedule data is registered in the common schedule data registration memory (FIG. 35B).

An operation of this embodiment will be described with reference to FIGS. 31 and 32.

A schedule data registration sequence of FIG. 32 will be briefly described below.

When the telephone CPU 301 detects depression of the schedule key 304 of the extension telephone 602 at the time of a user request for transferring schedule data of the electronic notebook 603 to this key telephone system, this is informed to the main apparatus 603 via the main apparatus interface 302. When the main apparatus CPU 607 detects this, a schedule data transfer request is sent to the electronic notebook 601 via the extension telephone 602. Upon reception of this request, the electronic notebook 601 starts transfer of the schedule data. The schedule data is transferred to the main apparatus 603 via the extension telephone 602. The main apparatus 603 registers each received schedule data. When all the schedule data are output from the electronic notebook 601, the electronic notebook 601 informs the main apparatus 603 of the end of schedule data transfer via the extension telephone 602. The main apparatus 603 performs schedule data registration end processing and sends a command for displaying a registration number of the schedule data in the extension telephone upon completion of schedule registration. The extension telephone causes the LCD unit 309 to display the registration number and finishes processing.

Schedule data registration processing in the main apparatus 603 will be described in detail with reference to FIG. 31.

When the CPU 607 recognizes a schedule transfer ON state (step S162), a registration number counter is cleared to zero (step S163). When the CPU 607 recognizes the presence of an escape code in the received schedule data (step S164), the CPU 607 compares the year, month, day, and time of the received schedule with those from a built-in clock of the CPU 607 to determine whether the time represented by the input date is later than 5 or more minutes of the time of the system (step S165). If YES in step S165, the CPU 607 determines whether the escape code cannot be registered (step S166). If NO in step S166 and the escape code is determined to be an escape code of a personal schedule (steps S167), the year, month, day, and time are registered in the personal schedule registration memories in an order of old ones (step S168). When the CPU 607 determines in step S167 that the schedule is not a personal schedule, the CPU 607 recognizes it as a common schedule in step S169. In this case, the received schedule data are stored in the common schedule data registration memory in an order of older ones as in step S168 (step S170). When registration is completed, the registration counter is incremented (step S171), and the CPU 607 further checks whether schedule data are still left (step S172). If additional schedule data are received, the flow returns to step S164 to perform the same operations as described above. When the CPU 607 receives an end-of-transfer signal in step S172, the CPU 607 causes the extension telephone to display the registration number (step S173) and completes the processing (step S174).

When no escape code is present in the received schedule data (step S164), when the year, month, day, and time of the schedule are advanced five or less minutes after those managed by the main apparatus (step S165), or when the escape code cannot be registered or recognized (N in step S169), the CPU 607 does not perform registration processing. In this case, the registration is not incremented, and the flow advances to step S172.

As described above, the type of the schedule data is recognized by a specific character pattern in the schedule data received from the electronic notebook 601 and is registered in the memory. A schedule which is not to be registered cannot be registered, and private schedules can be distinctly distinguished from common schedules. In addition, if a schedule of a given person is to be checked, an operator operates the key 306 of the extension telephone 602 to access the personal schedule registration memory. Similarly, if an operator wishes to check a common schedule, he accesses the common schedule registration memory.

If the schedule data received from the electronic notebook 601 are older than the given date, they are not registered. Therefore, unnecessary old schedules left when the operator forgets to delete them need not be presented to the user. A memory will not be wastefully consumed from the viewpoint of the efficient use of a memory capacity.

In addition, when old schedules are registered in the electronic notebook 601 upon determination of date and time, the CPU 607 causes the display unit of the extension telephone to display a message representing this, thereby recommending the user to delete the old schedules, thereby offering better services.

Fourteenth Embodiment

In this embodiment, time corresponding to a card insertion state in the extension telephone is stored, and the storage time is output, thereby managing the working start and end times of the workers without performing cumbersome operations.

In this embodiment, the date and time are registered and updated at the key telephone system, and working start and end time data are stored together with the date in units of personal I (identification) numbers, thereby referring to the working start and end time data of each worker.

FIG. 36 is a perspective view of an extension telephone 401 and an electronic notebook 403 in the telephone system of this embodiment.

In the telephone system of this embodiment, the plurality of extension telephones 401 and an office line are selectively connected by a main apparatus 412.

Referring to FIG. 36, an electronic notebook mounting portion 402 is formed on the side surface of the extension telephone 401. The electronic notebook 403 can be mounted in the mounting portion 402. An electronic notebook detection switch constituted by a microswitch or the like and an infrared LED light-receiving portion consisting of seven phototransistors are arranged in the mounting portion 402.

The telephone 401 has a key 406 for setting various data in the exchange apparatus or telephone, a liquid crystal display unit 407 for displaying a dial number or the like, dial keys 408 for inputting a dial number, and an office line key 409 for selecting the office line.

Figure 37:
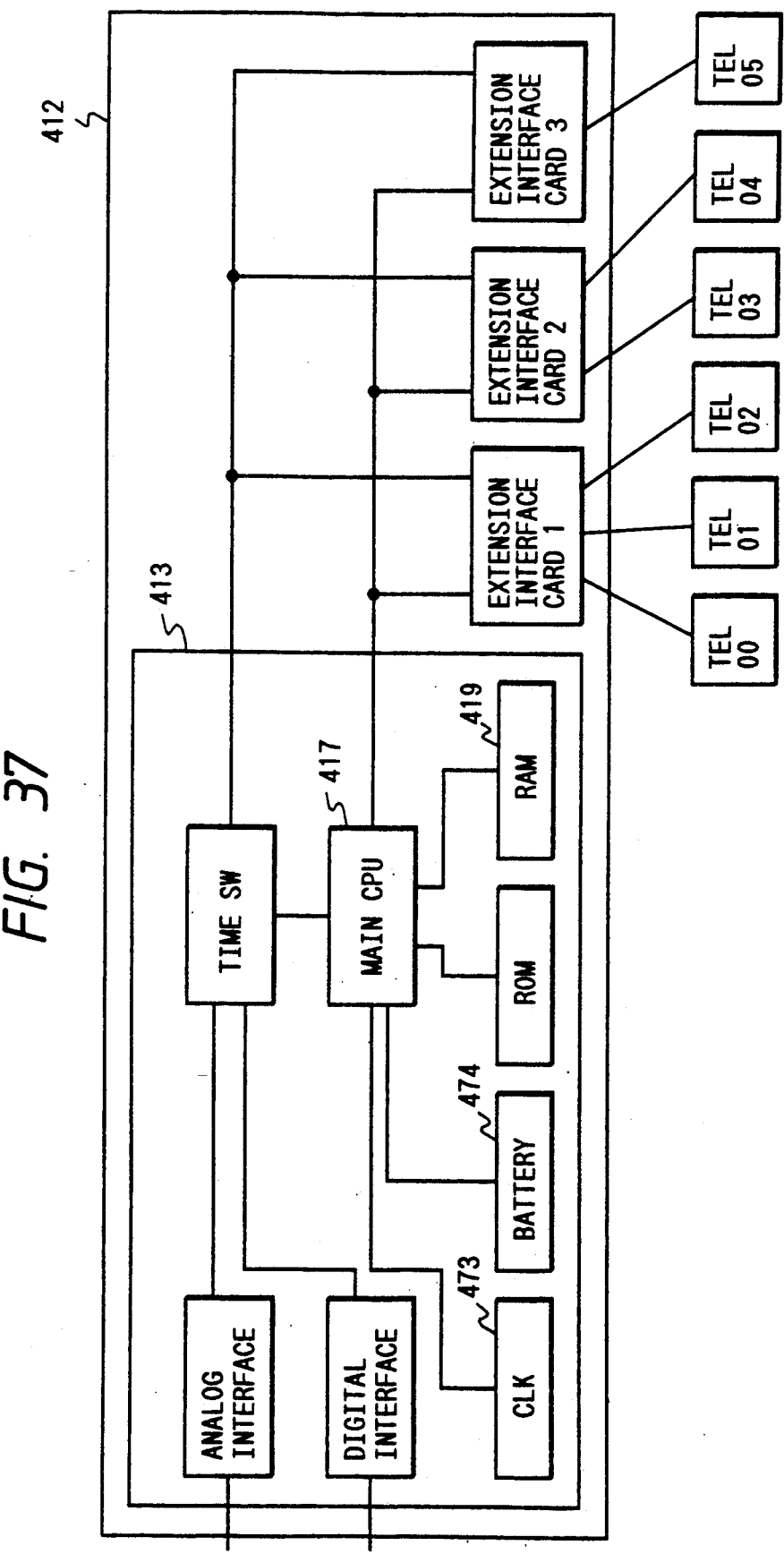
FIG. 37 is a block diagram showing a system according to the fourteenth embodiment.

FIG. 37 is a schematic block diagram of the apparatus of this embodiment.

The main apparatus 412 accommodates an analog office line and an ISDN office line. Analog and digital interfaces for performing interface between these office lines, a time switch, a main CPU 417, a ROM, and a RAM 419 are mounted on a main board 413. The main CPU 417 controls the respective circuit components in accordance with data registered in the ROM and the RAM 419.

The main apparatus 412 has three extension interface cards 1 to 3. Each extension interface card is controlled by the main CPU via control lines. A highway is arranged between each extension interface card and the time switch. Each extension interface card is connected to each telephone via an extension transmission line.

Figure 38:
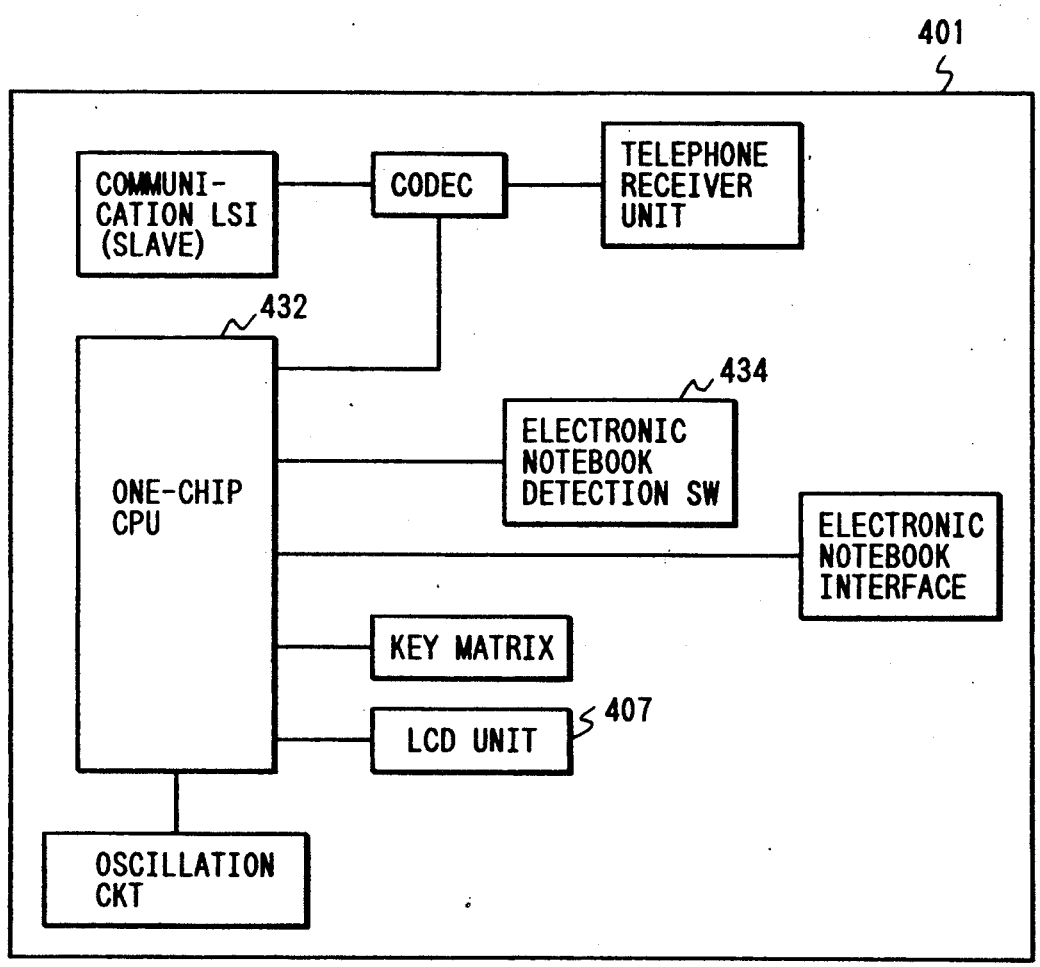
FIG. 38 is a block diagram showing an arrangement of the extension telephone according to the fourteenth embodiment.

FIG. 38 is a block diagram showing an internal arrangement of the extension telephone 401.

The extension telephone 401 includes an extension communication LSI (slave), a codec, a one-chip CPU (incorporating ports, a ROM, and a RAM) 432, a telephone receiver unit, an electronic notebook interface including the infrared LED light-receiving portion, a key matrix, and an oscillation circuit. The extension telephone 401 also includes the electronic notebook detection switch 434 and the liquid crystal display unit 407.

The electronic notebook 403 has a function of registering a destination personal or corporate name, and the corresponding telephone number. In this embodiment, set data can also be registered as described above.

Various keys such as a ten-key pad, a search key, a registration key, and a display unit are arranged on the surface of the electronic notebook 403. The seven infrared LEDs are arranged on the lower surface of the electronic notebook 403. By flashing these infrared LEDs, data can be transferred to the infrared LED light-receiving portion of the extension telephone 401.

Operations of the above embodiment will be described below. (Registration of ID in Electronic Notebook)

The electronic notebook 403 shown in FIG. 36 has an ID key 469. An ID number of "123" can be registered in the RAM in the electronic notebook 403 upon sequential key depression of "ID", "1", "2", "3", and "ID".

The electronic notebook 403 is a memory card which stores, e.g., abbreviated dial numbers.

Registration of Date and Time in Key Telephone Main Apparatus

The extension telephone 401 in FIG. 36 has a day and time key for registering the date and time. When date and time are to be registered in the main apparatus 412 for controlling the plurality of extension telephones, the date and time can be registered upon sequential key depression in an order of "date and time" "8", "9", "1", "0", "2", "3", "1", "5", "0", "0", "date and time" so as to register the date and time as 15 : 00, Oct. 23, 1989. The registered data is stored in the RAM 419 in the main apparatus 412.

Updating of Date and Time in Key Telephone Main Apparatus

The main board 413 in FIG. 37 has a clock 473. The main CPU 417 in the main apparatus 412 counts time by pulses from the clock 473 and updates the date and time stored in the RAM 419.

Storage of Working Time Data

Figure 39:
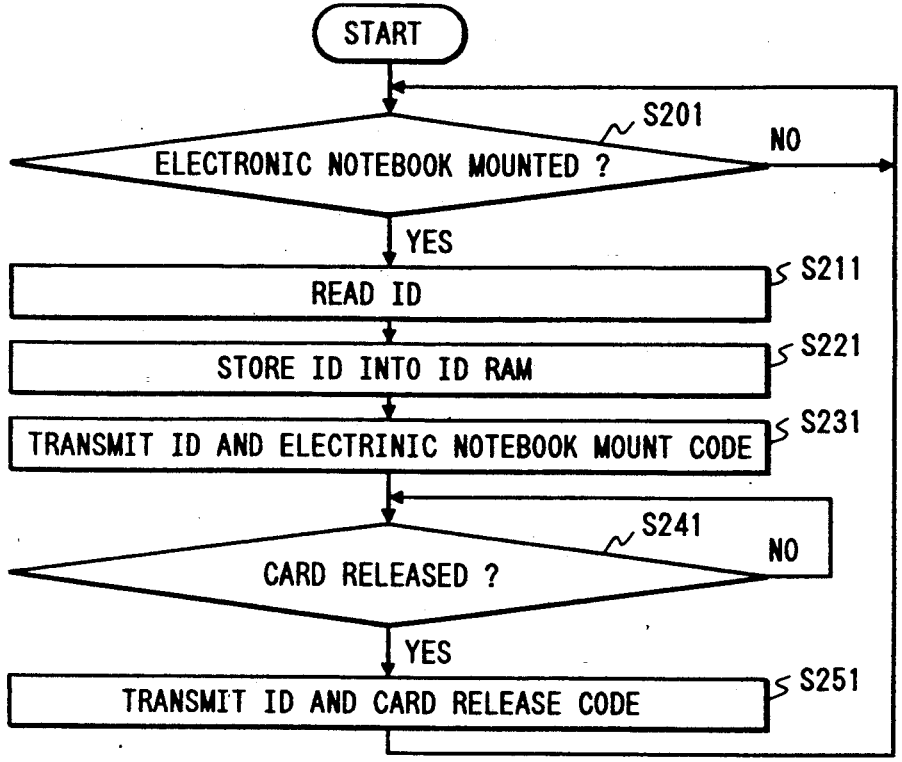
FIG. 39 is a flow chart of the extension telephone according to the fourteenth embodiment.
Figure 40:
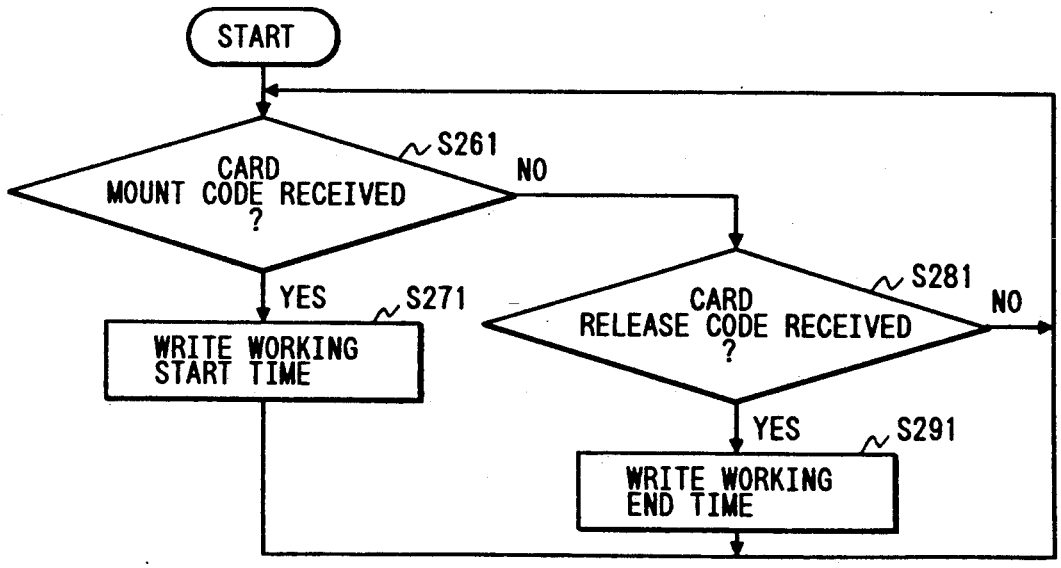
FIG. 40 is a flow chart of a main apparatus according to the fourteenth embodiment.

FIGS. 39 and 40 are flow charts showing control by the one-chip CPU 432 of the extension telephone 401 and the main CPU 417 of the main apparatus 412 at the time of working/non-working data storage.

When the one-chip CPU 432 of the extension telephone 401 causes the electronic notebook detection switch to detect mounting of the electronic notebook 403 (S201), the one-chip CPU 432 communicates with the electronic notebook 403 and an ID data is fetched (S211). The one-chip CPU 432 stores the ID data in the RAM incorporated therein (S221). The one-chip CPU 432 transmits a code representing mounting of the electronic notebook 403 and the ID data to the main apparatus 412 (S231). Upon reception of the code representing mounting of the electronic notebook 403 (S261), the main CPU 417 of the main apparatus 412 stores the working date and time in the RAM 419 in correspondence with the day and time read out from the RAM 419 and the received ID data (S271).

Operations for releasing the card can be performed in the same manner as described above. When the one-chip CPU 432 detects release of the electronic notebook 403 (S241), the ID data stored in the built-in RAM is added to a code, so that the code representing release of the electronic notebook 403 and the ID data are transmitted to the main apparatus 412 (S251). Upon reception of the code representing release of the electronic notebook 403 (S281), the main CPU 417 in the main apparatus 412 stores the stored date and time as the outgoing date and time in the RAM 419 in correspondence with the ID data (S291).

FIG. 41 shows the content of the RAM 419 which stores the working start and end date and time in correspondence with each ID data. The date and the working start and end times are stored after the ID data sandwiched by "#".

Reference of Working Time Data

The extension telephone in FIG. 36 has a working/non-working key 472. When working time data of Oct. 25, 1989 of a person having an ID of "123" is to be referred to, a series of key input operations are performed in an order of "working/non-working", "1", "2", "3", "date and time" "8", "", "1", "0", "2", "", "working/non-working". The working time data corresponding to the input ID is read out from the RAM 419 under the control of the main CPU 417. The working time data is output to the liquid crystal display unit 407 of the extension telephone 401 at which the key input operations are performed. FIG. 42 shows an output representing that the working start time is 7 : 55 and the working end time is 17 : 05.

The working time data may be output to the printer attached to the main apparatus 412.

According to this embodiment, as described above, without performing the cumbersome operations of a specific dial operation, the card is inserted into the telephone at the working start time and is released therefrom at the working end time, so that the personal working time data can be stored in the key telephone system. That is, according to this embodiment, a so-called electronic notebook is connected to the extension telephone, the ID of the electronic notebook is checked, and the working time of a worker having a specific ID can be managed on the basis of the mount and release times of the electronic notebook and the specific ID.

Fifteenth Embodiment

In this embodiment, IDs and schedules are registered in an electronic notebook, a key telephone main apparatus registers and updates date and time, and working time data and schedule data assigned to workers having specific IDs are stored, edited, and deleted together with the date.

The arrangement of the fifteenth embodiment is the same as that of the fourteenth embodiment.

Registration of ID and Schedule in Electronic Notebook

An electronic notebook 403 shown in FIG. 36 includes an "ID" key 469 and a schedule ("S") key 470. The electronic notebook 403 also has alphanumeric keys. An ID of "123" is registered in a RAM of the electronic notebook 403 by a series of key input operations in an order of "ID", "1", "2", "3", and "ID". Schedule data representing that a worker is going to be out for a factory from 11 o'clock in the morning to 5 o'clock in the evening of December 5, 1989 is registered in a RAM in an order of "S", "8", "9", "1", "2", "0", "5", "1", "1", "0", "0", "1", "7", "0", "0", "f", "a", "c", "t", "o", "r", "y", and "S".

Storage, Editing, and Deletion of Working Time Data and Schedule Data Together with Date Some setup operations must be performed to manage v working time data and schedule data. More specifically, time for setting working time data, whether old schedule data of an electronic notebook is deleted or not, and a reference for determining that schedule data is old must be set. These setup operations will be described below.

The time for setting the working time data may be set as twelve midnight by a key telephone system in advance, or may be set by a user. When the user sets settlement time of the working time data, the key 406 of the extension telephone 401 and number "1" special for setting the settlement time of the working time data are used to perform key input operations in an order of "set", "1", "0", "3", "0", "0", and "set", so that three o'clock in the morning is set as time for settling the working time data in a RAM 419 of a main keyboard 413.

When it is determined whether old schedule data in an electronic notebook is to be deleted is to be determined, and if old schedule data is to be deleted, a method of determining a determination reference is determined as follows. More specifically, the set key 406 in the extension telephone 401, special number "2" for determining whether the old schedule data is to be deleted, and numbers "0", "1", "2", and "3" (0: no deletion of schedule data; 1: deletion of schedule data older than that of the current time; 2: deletion of schedule data of the day before or more; and 3: deletion of schedule data a week before or more) are used. For example, if a key input in an order of "set", "2", "0", and "set" is performed, the old schedule data is not deleted. Key inputs in an order of "set", "2", "1", and "set", in an order of "set", "2", "2", and "set", and in an order of "set", "2", "3", and "set", old schedule data are deleted in accordance with the corresponding determination references. The set data are stored in the RAM 419 of the main board 413. There are three references for determining old schedule data. However, four or more references may be provided as determination references. Alternatively, a user may set to delete schedule data a few hours before the current time.

The above description has been associated with setup necessary for managing the working time data and the schedule data. A method of managing these setup data will be described below.

FIG. 43 shows a RAM of the RAM 419 of the main board 413. This RAM is used to manage working time data. As shown in FIG. 43, the RAM used for the working time data management is classified into a working time management RAM and a working time settlement RAM. The contents of these RAMs will be described in the following flow charts.

Figure 44:
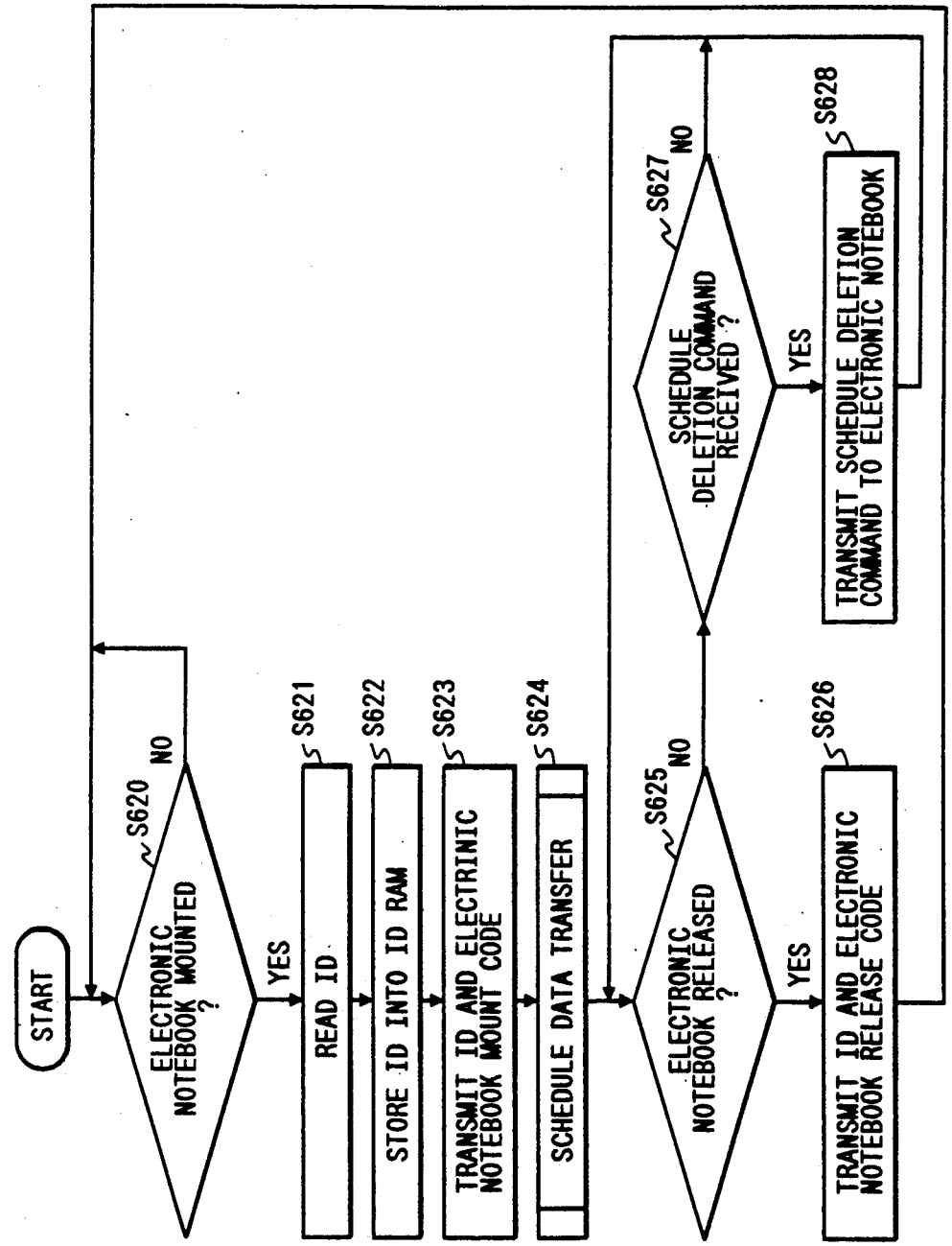
FIG. 44 is a flow chart of an extension telephone according to the fifteenth embodiment of the present invention.
Figure 45:
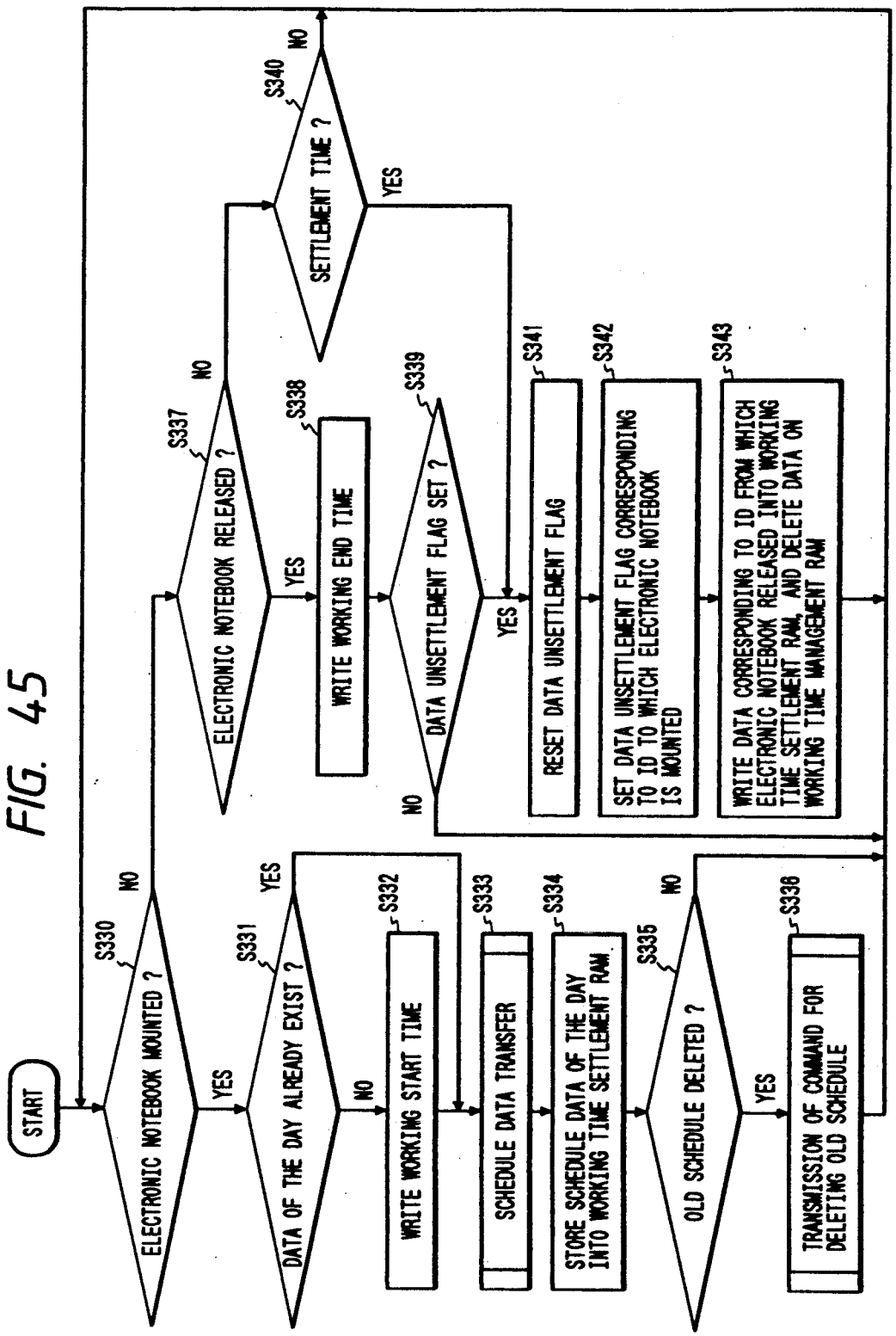
FIG. 45 is a flow chart of a main apparatus according to the fifteenth embodiment of the present invention.

FIGS. 44 and 45 are flow charts associated with storage data storage content of the one-chip CPU 432 of the extension telephone 401 and the main CPU 417 of the main apparatus 412.

When the one-chip CPU 432 of the extension telephone 401 causes the electronic notebook detection switch to detect mounting of the electronic notebook 403 (step S620), the one-chip CPU 432 communicates with the electronic notebook 403 to read an ID (step S621). The ID is stored in the RAM incorporated in the one-chip CPU 432 (step S622). The one-chip CPU 432 sends the ID and the electronic notebook mount code to the main apparatus (step S623).

Upon reception of the electronic notebook mount code (step S330), the main CPU 417 of the main apparatus 412 searches working time data in the working management RAM (step S331) in FIG. 43. If the day working data having the same ID are not stored in the working management RAM, the ID number and the working date and time are stored in the working management RAM (step S332). If data is already stored in the working management RAM, no operation is performed, and the next processing is executed.

The one-chip CPU 432 loads schedule data stored in the electronic notebook 403 and transfers it to the main apparatus (step S624). The main CPU 417 stores the transferred schedule data in the working management RAM (step S333) and writes the today's schedule in the working settlement RAM (step S334). The main CPU 417 determines whether deletion of the old schedule is set (step S335). If YES in step S335, a command (i.e., a command for deleting specific ones of the schedule data) for deleting the old schedule data corresponding to the determination reference is transmitted to the extension telephone 301 (step S336). Upon reception of the schedule detection command (step S627), the one-chip CPU 432 transmits a command for designating deletion of schedule data to the electronic notebook 403 (step S628). The electronic notebook 403 deletes the corresponding the schedule data.

Release of the electronic notebook can be performed in the same manner as described above. When the one-chip CPU 432 detects release of the electronic notebook 403 (step S625), an ID is added in the built-in RAM, and a code representing release of the electronic notebook and the ID are transmitted to the main apparatus 412 (step S626). Upon reception of the code representing release of the electronic notebook 03 (step S337), the working end time is written in the working management RAM (step S338). If a data unsettlement flag is set, processing for settling the data is executed. However, if the data unsettlement flag is not set, an idle state is restored (step S339). This data unsettlement flag is set in processing for settling the working data for each ID. When the current time reaches time for settling the working data (step S340), the main CPU 417 resets the data unsettlement flag (step S341). The data unsettlement flag is set in correspondence with the ID of the electronic notebook mounted at this moment (step S342). The working data corresponding to the ID of an electronic notebook which is not mounted is settled and written in the working settlement RAM. At the same time, the data in the working management RAM which corresponds to the data-settled ID is deleted (step S343). In this manner, by setting the data unsettlement flag, the working end time data can be stored in the key telephone by mounting the electronic notebook in the extension telephone by a worker who is still working at the working end time settlement time.

The contents of the working management RAM and the working settlement RAM in FIG. 43 will be described with reference to the flow charts.

The content of the working management RAM indicates that a worker having an ID of "123" mounts his electronic notebook in the extension telephone at 7 : 50 in the morning, Dec. 5, 1989. In this data, an item sandwiched by marks "#" is an ID, and the date, the working start time of 7 : 50, and the working end time of 0 : 00 are stored so as to follow % representing the working time management data. Since the working end time is set to be 0 : 00 because the electronic notebook is not released from the extension telephone. When the electronic notebook is released from the extension telephone, the time is stored as the working end time in the working time management RAM. For example, when a worker having an ID of "123" releases his electronic notebook at 7 : 55, the working end time is stored as 7 : 55. When the electronic notebook is mounted twice or more on the same day, updating of the working end time is not performed, and only the working end time is updated. For example, in the above case, when the worker having the ID of "123" mounts the electronic notebook at 11 : 05 again and immediately releases it, the working start time is kept at 7 : 50, and the working end time is updated to 11 : 05.

Data following the working time management data is schedule data transferred from the electronic notebook. Each schedule data is sandwiched by marks $. For example, data representing that a worker is going to go to Shinjuku from 13:00 to 15:00 on Dec. 1 and is going to go to a factory from 11:00 to 17:00. The schedule data of December 1 is left in the electronic notebook because the main apparatus of the key telephone system is set in a mode for preventing deletion of the schedule data or in a mode for deleting only schedule data a weak before. For example, when a mode is set to delete past schedule data the day before or more, the schedule data of Dec. 1 is deleted from the electronic notebook at a time when the electronic notebook is mounted on Dec. 4 (the electronic notebook is mounted on Dec. 4).

Data stored in the working time settlement RAM are the settled working management data and the schedule data at the working time settlement time. For example, the worker having an ID of "123" had a schedule that he was out in Shinjuku from 13:00 to 15:00 on Dec. 1. The working start time of this day was 7:53, and the working end time was 21:03. More specifically, the worker having an ID of "123" was going to go to Shinjuku, returned to his company, and finally left the company at 21:03. "Dec. 4" is not schedule data, but indicates that the worker worked from 7:51 to 20;35. "Dec. 5" represents date which does not reach the working time settlement time, and the corresponding schedule data is not stored in the working time management RAM. For example, assuming the worker having an ID of "123" leaves for the factory at 11:05 and does not return to the office, when the current time reaches the working time settlement time, data of "%89120507501105" is stored in the working time settlement RAM, and information associated with the ID of "123" is deleted from the working time management RAM. When the schedule data is included in the working time data as in the data of "Dec. 1", the schedule data is deleted. When the working end time overlaps the schedule data as in data of "Dec. 5", the working times are given as 7:50 and 17:00, thereby performing editing such as deletion of the schedule data.

The main board 413 shown in FIG. 37 includes a battery 474. This battery is powered upon power-ON operation. When a power failure occurs, power is supplied from the battery 474 to the main CPU 417 to assure its operation and the storage content of the RAM 419.

Figure 46:
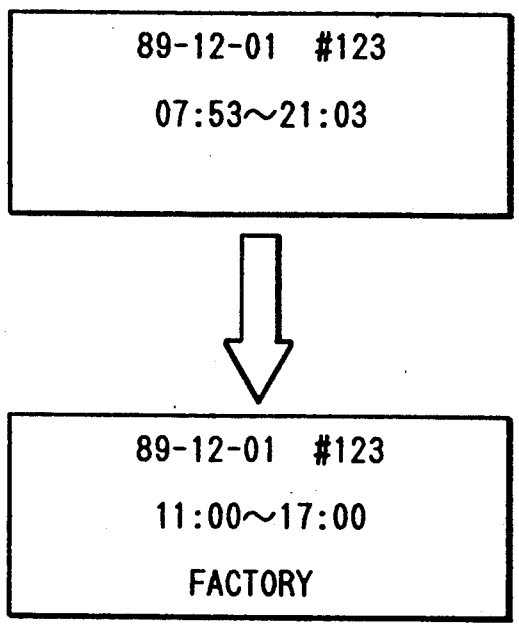
FIG. 46 is a view showing a change in display according to the fifteenth embodiment.

If the working/non-working key 472 of the extension telephone 401 in FIG. 36 is operated to refer to the working time data and the schedule data of the worker having the ID of "123" on Dec. 1, 1989, a key input is performed in an order of "working/non-working", "1", "2", "3", "date", "8", "9", "1", "2", "0", "5", and "working/non-working". By this operation, the working time data and the schedule data are displayed on the liquid crystal display unit 406 of the extension telephone. An output example is shown in FIG. 46. The working time data and the schedule data are alternately displayed every two seconds. The output may be printed on the attached printer.

As described above, the working time data can be registered in the main apparatus together with the ID of the electronic notebook and can be accessed by any extension telephone. The working time data can be displayed on any extension telephone. Therefore, management of the working time data can be much simply performed.

The presence/absence of the user of the card can be managed from the accessible extension telephone without requiring complicated operations.

According to this embodiment, the schedules managed by the respective electronic notebooks can be collectively managed. Therefore, the schedules of others can be easily known, and adjustment of a plurality of persons can be simplified.

The present invention has been described with reference to the preferred embodiments. However, the present invention is not limited to the above embodiments. Various changes and modifications may be made within the spirit and scope of the invention.

What is claimed is:

1. A telephone apparatus comprising:
    means for receiving data from a card;
    timepiece means; and
    means for alarming a coincidence between time data included in the data received from said receiving means and time data of said timepiece means.

2. An apparatus according to claim 1, wherein said alarming means performs a display on the basis of display data included in the data received from said receiving means.

3. A key telephone system comprising:
    (1) an extension telephone comprising
        (a) means for receiving data from a card,
        (b) display means, and
        (c) ringing means; and
    (2) a main unit comprising
        (a) timepiece means, and
        (b) means for controlling said display means or said ringing means to alarm a coincidence between time data included in the data received from said receiving means and time data of said timepiece means when these time data coincide with each other.

4. An apparatus according to claim 3, wherein said control means causes said display means to perform a display on the basis of display data included in the data received from said receiving means.

5. An apparatus according to claim 3, wherein said main unit accommodates a plurality of extension telephones, and
    said control means drives said display or ringing means of said plurality of extension telephones including an extension telephone which inputs the time data coinciding with the time data of said timepiece means.

6. A reception control apparatus comprising:
    input means for inputting schedule data;
    timepiece means; and
    control means for performing reception control on the basis of comparison between the schedule data input from said input means and the time data of said timepiece means.

7. An apparatus according to claim 6, wherein the reception control by said control means includes a call transfer or a voice response.

8. An apparatus according to claim 6, wherein said input means inputs the schedule data from a memory card.

9. An apparatus according to claim 6, wherein the schedule data includes time data.

10. A telephone exchange apparatus comprising:
    input means for inputting schedule data;
    timepiece means; and
    control means for performing reception control on the basis of comparison between the schedule data input from said input means and time data from said timepiece means upon reception of an incoming call.

11. An apparatus according to claim 10, wherein the reception control by said control means includes a call transfer or a voice response.

12. An apparatus according to claim 10, wherein said input means inputs the schedule data from a memory card.

13. An apparatus according to claim 10, wherein said input means inputs the schedule data from an extension telephone.

14. An apparatus according to claim 10, wherein said input means inputs the schedule data from a memory card set in an extension telephone.

15. An apparatus according to claim 10, wherein the schedule data includes time data.

16. An apparatus according to claim 10, wherein the schedule data includes data representing whether a callee is present.

17. A reception control apparatus comprising:
setting means for setting a card; and
control means for performing reception control on the basis of whether the card is set in said setting means upon reception of an incoming call.

18. An apparatus according to claim 17, wherein the reception control by said control means includes a call transfer or a voice response.

19. A telephone exchange apparatus comprising:
means for receiving schedule data from a memory card set in an extension telephone;
memory means for storing the schedule data received from said receiving means; and
output means for reading out the schedule data from said memory means and outputting the readout schedule data on the basis of designation from said extension telephone.

20. An apparatus according to claim 19, wherein said output means outputs the readout schedule data to a facsimile apparatus.

21. A telephone exchange apparatus comprising:
means for detecting that a card is set in an extension telephone;
timepiece means;
memory means for storing time data from said timepiece means when said detecting means detects that the card is set in said extension telephone; and
output means for outputting the time data stored in said memory means.

22. An apparatus according to claim 21, further comprising means for reading identification data from the card, and wherein said memory means stores the time and identification data obtained upon setting of the card, the time data being stored in association with the identification data.

23. An apparatus according to claim 21, wherein said output means outputs the time data to a display unit or a printer.

24. An apparatus according to claim 23, wherein said output means outputs the time data on a display unit of said extension telephone.

25. A telephone apparatus comprising:
means for receiving data from a card;
timepiece means; and
display means for performing a display on the basis of display data included in the data received from said receiving means when time data included in the data received from said receiving means coincides with time data of said timepiece means.

26. An apparatus according to claim 25, wherein said display means causes alarming means to ring when the time data included in the data received from said receiving means coincides with the time data of said timepiece means.

27. An apparatus according to claim 19, wherein said output means outputs the readout schedule data to a computer.

28. An apparatus according to claim 21, further comprising a battery for supplying power to said memory means in a power failure state.

29. A call processing method comprising the steps of:
reading schedule data from a memory card;
determining, when a call request is detected, a process for the call request on the basis of the read schedule data; and
executing the determined process.

30. A method according to claim 29, wherein, in said reading step, the schedule data is read from the memory card set in an extension telephone.

31. A method according to claim 29, wherein, in said determining step, a destination to which a call is transferred is determined.

32. A method according to claim 29, wherein, in said executing step, a voice response is executed.

33. A telephone exchange apparatus comprising:
reception means for receiving schedule data from a memory card set in an extension telephone;
memory means for storing the schedule data received from said reception means; and
output means for outputting the stored schedule data to a computer on the basis of an instruction from said extension telephone.

34. A telephone exchange apparatus comprising:
detection means for detecting that a card is released from an extension telephone;
timepiece means;
memory means for storing time data from said timepiece means when said detection means detects that the card is released from said extension telephone; and
output means for outputting the time data stored in said memory means.

35. An apparatus according to claim 34, further comprising:
read means for reading identification data from the card, and
wherein said memory means stores the time data and the identification data obtained upon releasing of the card, the time data being stored in association with the identification data.

36. An apparatus according to claim 34, wherein said output means outputs the time data to a display unit or a printer.

37. An apparatus according to claim 36, wherein said output means outputs the time data on a display unit of said extension telephone.

* * * * *

UNITED STATES PATENT AND TRADEMARK OFFICE
CERTIFICATE OF CORRECTION

PATENT NO. : 5,138,655

DATED : August 11, 1992

INVENTOR(S) : SHOICHI TAKASHIMA ET AL.

It is certified that error appears in the above-identified patent and that said Letters Patent is hereby corrected as shown below:

Drawings:

SHEET 43 OF 45

FIG. 44, "ELECTRINIC" should read --ELECTRONIC--.

COLUMN 2

Line 24, Close up the right margin.
    Line 25, Close up the left margin.
    Line 57, "a flow chart" should read --flow charts--.
    Line 59, "a flow chart" should read --flow charts--.

COLUMN 3

Figure 19B:
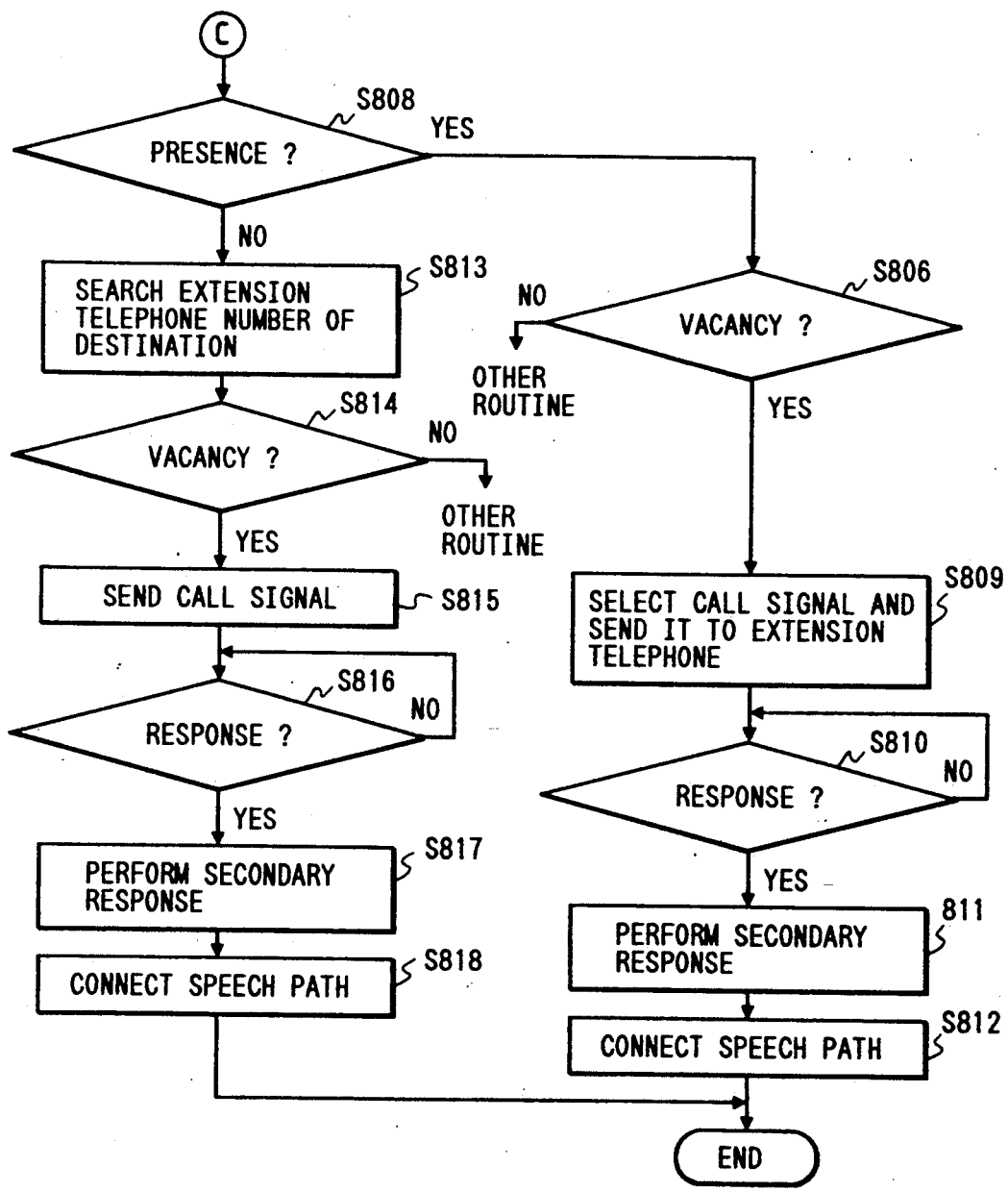
FIG. 19 is a flow chart showing an operation according to the ninth embodiment.

Line 3, "Fig. 19 is a flow chart" should read--Figs. 19-19B are flow charts. Line 31, "flow chart" should read -- Figs. 31-31B are flow charts--.

COLUMN 4

Line 68, "ma" should read --may--.

COLUMN 5

Line 29, "at time" should read --at the time--.

COLUMN 6

Line 21, "Oct. 11." should read --Oct. 22.--.

COLUMN 8

Figure 7:
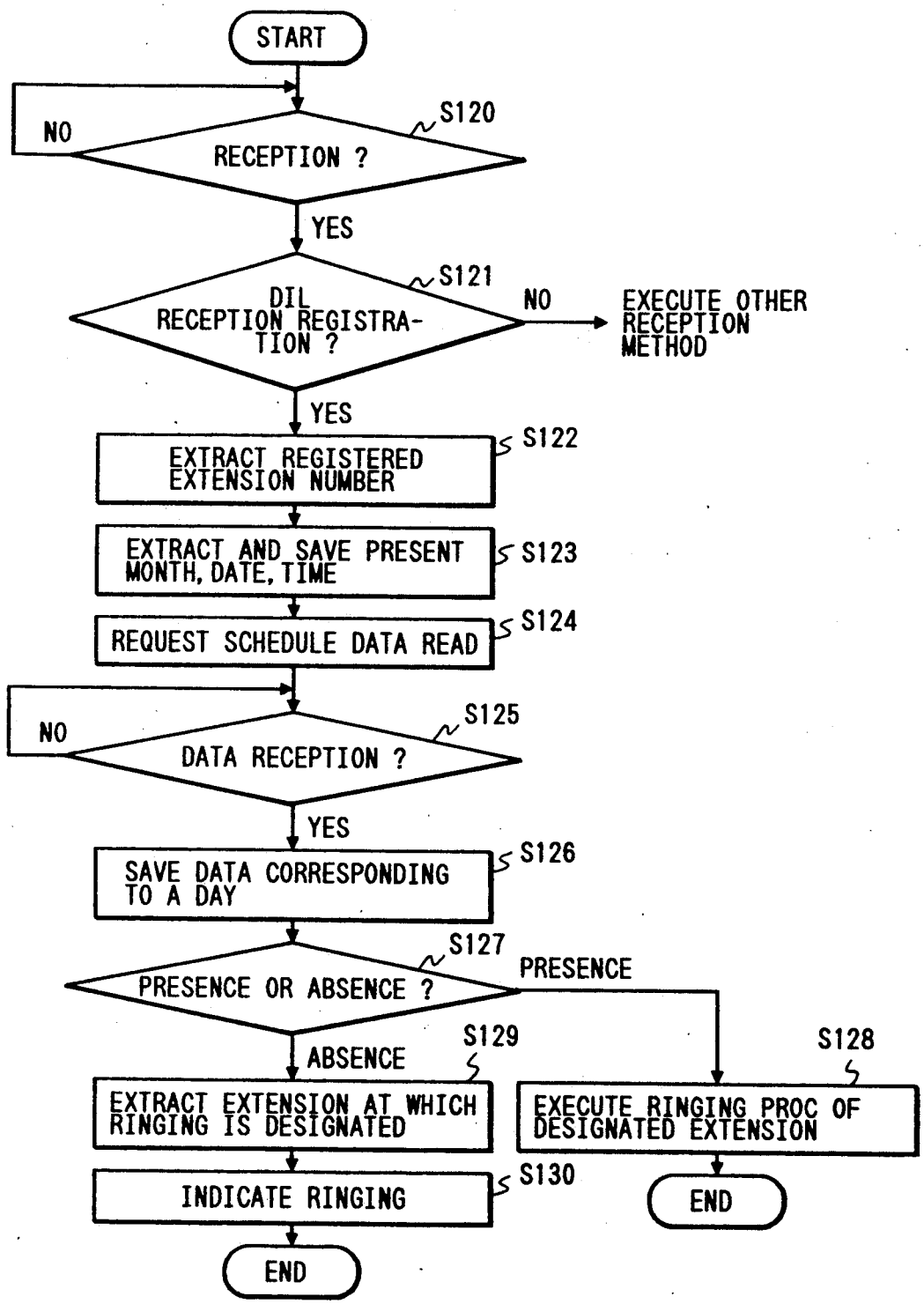
FIG. 7 is a flow chart showing an operation according to the second embodiment.

Line 57, "FIG. 7. When" should read --Fig. 7. ¶ When--.

UNITED STATES PATENT AND TRADEMARK OFFICE
CERTIFICATE OF CORRECTION

PATENT NO. : 5,138,655
DATED : August 11, 1992
INVENTOR(S) : SHOICHI TAKASHIMA ET AL.

It is certified that error appears in the above-identified patent and that said Letters Patent is hereby corrected as shown below:

COLUMN 10

Line 24, "signal. In" should read --signal. ¶ In--.

COLUMN 18

Line 7, "personal I" should read --personal ID--.

COLUMN 19

Line 2, "(Registration of ID in Electronic Note" should be deleted.
    Line 3, "book)" should read as heading --Registration of ID in Electronic Notebook--.

COLUMN 20

Line 4, """, "1", "0", "2", ""," should read --"9", "1", "0", "2", "5",--.

COLUMN 22

Line 9, "the" should be deleted.
    Line 17, "notebook 03" should read --notebook 403--.

UNITED STATES PATENT AND TRADEMARK OFFICE
CERTIFICATE OF CORRECTION

PATENT NO. : 5,138,655

DATED : August 11, 1992

INVENTOR(S) : SHOICHI TAKASHIMA ET AL.

It is certified that error appears in the above-identified patent and that said Letters Patent is hereby corrected as shown below:

COLUMN 23

Line 22, "20;35." should read --20:35--.

Signed and Sealed this

Eleventh Day of January, 1994

Attest:

BRUCE LEHMAN

Attesting Officer

Commissioner of Patents and Trademarks